US011267967B2

(12) United States Patent
Kim et al.

(10) Patent No.: US 11,267,967 B2
(45) Date of Patent: Mar. 8, 2022

(54) COMPOSITION, ELECTRO-OPTIC MATERIAL, ELECTRO-OPTIC DEVICE, AND METHOD FOR PREPARING ELECTRO-OPTIC MATERIAL

(71) Applicant: SAMSUNG ELECTRONICS CO., LTD., Suwon-si (KR)

(72) Inventors: Min Sang Kim, Anseong-si (KR); Sang Soo Jee, Hwaseong-si (KR); Yoon Seok Ko, Suwon-si (KR); Hyunjeong Jeon, Seoul (KR); Kyeong-Sik Ju, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 44 days.

(21) Appl. No.: 16/907,448

(22) Filed: Jun. 22, 2020

(65) Prior Publication Data

US 2020/0407555 A1 Dec. 31, 2020

(30) Foreign Application Priority Data

Jun. 26, 2019 (KR) ........................ 10-2019-0076535

(51) Int. Cl.

*C08L 79/08* (2006.01)
*G02F 1/361* (2006.01)
*G02F 1/365* (2006.01)

(52) U.S. Cl.

CPC .............. *C08L 79/08* (2013.01); *G02F 1/365* (2013.01); *G02F 1/3612* (2013.01)

(58) Field of Classification Search

None

See application file for complete search history.

(56) References Cited

U.S. PATENT DOCUMENTS

| | | | | |
|---|---|---|---|---|
| 6,784,287 B2 | 8/2004 | Do | | |
| 6,894,169 B1 * | 5/2005 | Wang | .................. | C07D 213/57 252/299.63 |
| 7,250,121 B2 * | 7/2007 | Yamamoto | ......... | C08G 73/1039 252/582 |
| 7,297,297 B2 | 11/2007 | Do et al. | | |

(Continued)

FOREIGN PATENT DOCUMENTS

| | | |
|---|---|---|
| CN | 101851332 B | 10/2011 |
| CN | 106939081 A | 7/2017 |

(Continued)

OTHER PUBLICATIONS

L Bes, et al., Synthesis and characterization of aromatic polyimides bearing nonlinear optical chromophores; High Perform. Polym. 12 (2000) 169-176.

(Continued)

*Primary Examiner* — Rhonda S Peace
*Assistant Examiner* — R. Peace
(74) *Attorney, Agent, or Firm* — Cantor Colburn LLP

(57) ABSTRACT

A composition for preparing an electro-optic material including a first polyimide having a high molecular weight, and a second polyimide having a lower molecular weight and including a structural unit including a chromophore functional group in the side chain, an electro-optic material including the composition, an electro-optic device including the electro-optic material, and a method of preparing the electro-optic material.

20 Claims, 4 Drawing Sheets

(56) References Cited

U.S. PATENT DOCUMENTS

| | | | | |
|---|---|---|---|---|
| 7,671,141 | B2 * | 3/2010 | Hsu | C08G 73/1039 525/420 |
| 8,561,812 | B2 | 10/2013 | Liu et al. | |
| 8,618,241 | B2 * | 12/2013 | Chen | G02F 1/3614 528/380 |
| 2003/0092869 | A1 | 5/2003 | Yu | |
| 2005/0253120 | A1 * | 11/2005 | Yamamoto | C08G 73/1039 252/586 |
| 2006/0049387 | A1 * | 3/2006 | Huang | C08G 73/1039 252/586 |
| 2009/0005561 | A1 * | 1/2009 | Goetz | G02F 1/3612 544/340 |
| 2012/0085233 | A1 | 4/2012 | Liu et al. | |
| 2013/0170016 | A1 * | 7/2013 | Hsieh | G02B 1/04 359/299 |
| 2020/0407555 | A1 * | 12/2020 | Kim | C08G 73/1039 |
| 2021/0088872 | A1 * | 3/2021 | Kim | C08L 33/10 |

FOREIGN PATENT DOCUMENTS

| | | | |
|---|---|---|---|
| KR | 100169910 | B1 | 3/1998 |
| KR | 0217537 | B1 | 9/1999 |
| KR | 0226441 | B1 | 10/1999 |
| KR | 0284814 | B1 | 12/2000 |
| KR | 0445909 | B1 | 8/2004 |
| KR | 101359166 | B1 | 2/2014 |

OTHER PUBLICATIONS

Man He, et al., Synthesis and nonlinear optical properties of soluble fluorinated polyimides containing hetarylazo chromophores with large hyperpolarizability, Polymer 50 (2009) 3924-3931.

Yu Sui, et al., Side-chain second-order nonlinear optical polyzurethane-imide/rphotosensitive polyimide blends with the improved dipole orientation stability by photo-crosslinking, Materials Letters 52 (2002) 53-56.

* cited by examiner

COMPOSITION, ELECTRO-OPTIC MATERIAL, ELECTRO-OPTIC DEVICE, AND METHOD FOR PREPARING ELECTRO-OPTIC MATERIAL

CROSS-REFERENCE TO RELATED APPLICATION

This application claims priority to Korean Patent Application No. 10-2019-0076535 filed in the Korean Intellectual Property Office on Jun. 26, 2019, and the benefits accruing therefrom under 35 U.S.C. 119, the content of which in its entirety is incorporated herein by reference.

BACKGROUND

1. Field

A composition, an electro-optic material, an electro-optic device, and a method of preparing an electro-optic material are disclosed.

2. Description of the Related Art

Many of the present-day electronic circuits used in information transfer and storage are limited in terms of their processing speed or storage capacity, and new technical developments of electronic circuits for enhancing such functions is needed. Much attention is presently focused on optic circuits as the next generation circuits, which use light as an information transmission medium. As a result of the high speed, broadband, and parallelism of light, one would expect to process information at a higher speed or greater storage capacity than the present circuits that use electrons. Electro-optic devices using light may realize their functions using nonlinear optic effects of compounds. As light passes through a medium that exhibits nonlinear optic properties, phases, amplitudes, and refractive indices change, and if one or more of these optical effects are used properly, electro-optic devices could have great potential for use in optical signal processing, photosensors, optic communications, and the like.

An inorganic crystal material such as lithium niobate ($LiNbO_3$) may be used as a nonlinear optic material, but the inorganic crystal is expensive due to technical hurdles in the device production process. Accordingly, recent attention has focused on organic polymeric nonlinear optic materials, which have relatively better workability and may be manufactured at lower cost. Organic polymeric nonlinear optic materials typically have a lower dielectric constant than an inorganic material, a particularly good nonlinear optic property, and/or a faster switching speed than lithium niobate semiconductor material (50 picoseconds vs. 2 nanoseconds) and a wider bandwidth than lithium niobate semiconductor material. Moreover, organic polymeric nonlinear optic materials may have advantages for connecting fiber arrays, and has a merit with good workability. That is, the organic optoelectronic polymeric material has an advantageous merit as the material for an electro-optic device.

Although the electro-optic device prepared with an organic polymeric material may have superior characteristics than the electro-optic device using an inorganic material, the organic polymeric material is typically less thermally stable and the light transmission loss or leakage can be relatively large in comparison to an inorganic material. Therefore, much research has focused on ways to minimize these problems.

SUMMARY

An embodiment provides a polyimide-based composition for preparing an electro-optic material that has high glass transition temperature, is easy to process, has excellent heat resistance, and has long sustainable nonlinear optic properties.

Another embodiment provides an electro-optic material including the composition.

Another embodiment provides an electro-optic device including the electro-optic material.

Another embodiment provides a method of preparing an electro-optic material including curing the composition.

An embodiment provides a composition for preparing an electro-optic material including a first polyimide having a high molecular weight, and a second polyimide having a low molecular weight and including a structural unit including a chromophore functional group in the side chain.

The first polyimide may have a weight average molecular weight of greater than or equal to about 100,000 grams per mole (g/mol) and the second polyimide may have a weight average molecular weight of less than or equal to about 50,000 g/mol.

A content of the structural unit including the chromophore functional group in the side chain may be less than about 50 weight percent (wt %) based on a total weight of the first polyimide and the second polyimide.

A content of the structural unit including the chromophore functional group in the side chain may be about 1 weight % to about 30 weight % based on a total weight of the first polyimide and the second polyimide.

In the composition, the first polyimide and the second polyimide may be included in a weight ratio of about 99:1 to about 50:50.

The first polyimide may include a structural unit represented by Chemical Formula 1 and the second polyimide may include a structural unit represented by Chemical Formula 2:

Chemical Formula 1

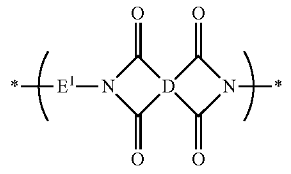

Chemical Formula 2

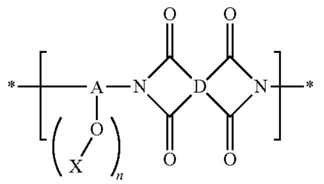

In Chemical Formula 1 and Chemical Formula 2

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, $E^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, A is a substituted or unsubstituted C4 to C30 alicyclic organic group, a substituted or unsubstituted C6 to C30 aromatic organic group, or a substituted or unsubstituted C4 to C30 heteroaromatic organic group, or a combination thereof, in D, $E^1$, and A, the substituted alicyclic organic group, the aromatic organic group, the heteroaromatic organic group, or the combination thereof is a single ring, a condensed ring in which at least two rings are fused, or at least two rings of the single ring or the condensed ring, each if which is linked to the other by a single bond, a fluorenylene group, —O—, —S—, —C(═O)—, —CH(OH)—, $—S(═O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein $1 \le n \le 10$, $1 \le p \le 10$, and $1 \le q \le 10$), $—C(CF_3)(C_6H_5)—$, —C(═O)NH—, or a combination thereof, X is a chromophore functional group, and n of Chemical Formula 2 is an integer of 1 to 4.

D of Chemical Formula 1 and Chemical Formula 2 may independently be selected from chemical formulae of Group 1:

Group 1

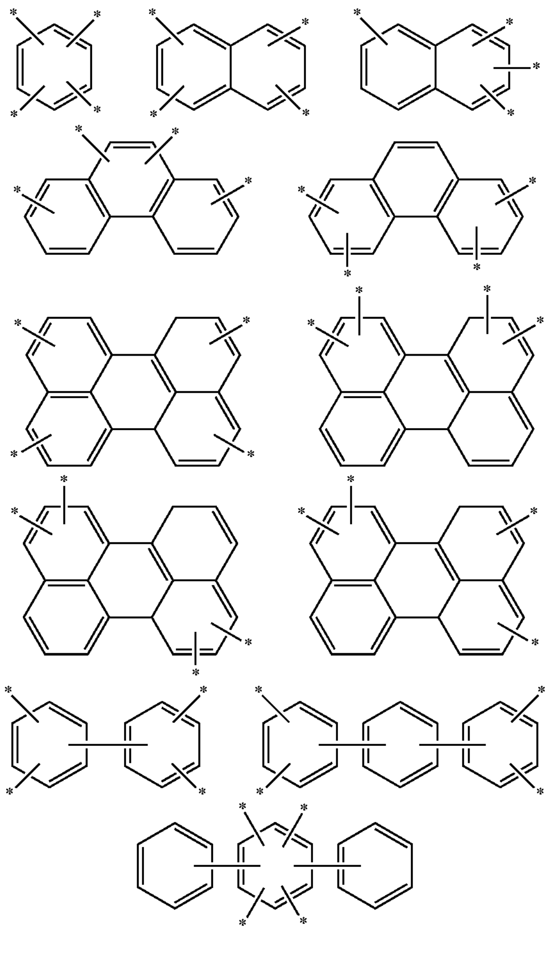

-continued

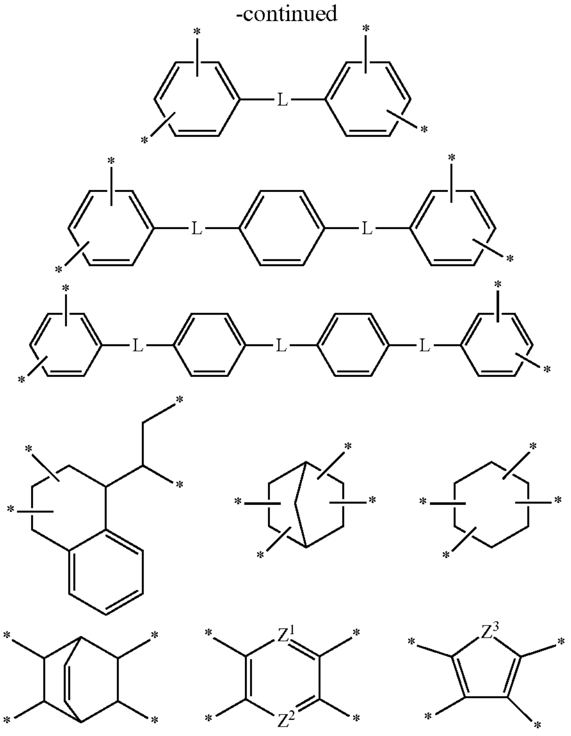

wherein, in the chemical formulae of Group 1, each moiety may be substituted or unsubstituted, each L may be the same or different and may independently be a single bond, a fluorenylene group, —O—, —S—, —C(═O)—, —CH(OH)—, $—S(═O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein $1 \le n \le 10$, $1 \le p \le 10$, and $1 \le q \le 10$), $—C(CF_3)(C_6H_5)—$, or —C(═O)NH—, and

* is a linking portion with an adjacent atom, $Z^1$ and $Z^2$ may be each the same or different and may independently —N═ or $—C(R^{100})═$, wherein $R^{100}$ is hydrogen or a C1 to C5 alkyl group, provided that $Z^1$ and $Z^2$ are not simultaneously $—C(R^{100})═$, and $Z^3$ is —O—, —S—, or $—NR^{101}—$, wherein $R^{101}$ is hydrogen or a C1 to C5 alkyl group.

$E^1$ of Chemical Formula 1 and A of Chemical Formula 2 may independently be a substituted or unsubstituted C6 to C30 aromatic single ring, a C10 to C30 condensed ring in which at least two substituted or unsubstituted aromatic rings are fused, or at least two aromatic rings of the single ring or the condensed ring, each of which is linked to the other by a single bond, or —O—, —S—, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein, $1 \le n \le 10$, $1 \le p \le 10$, and $1 \le q \le 10$), $C(CF_3)(C_6H_5)—$, —C(═O)NH—, or a combination thereof.

$E^1$ of Chemical Formula 1 and A of Chemical Formula 2 may independently be a group in which substituted or unsubstituted two phenylene groups are linked by a single bond, or —O—, —S—, $—(CH_2)_p—$, $—(CF_2)_q—$, $—C(C_nH_{2n+1})_2—$, $—C(C_nF_{2n+1})_2—$, (wherein $1 \le n \le 10$, $1 \le p \le 10$, and $1 \le q \le 10$), or a combination thereof and —(O—X)n linked with A of Chemical Formula 2 may include the two phenylene groups with which each —O—X is linked.

The chromophore functional group may be one or more of those represented by Chemical Formulae 3-1 to 3-8:

-continued
(3-1)
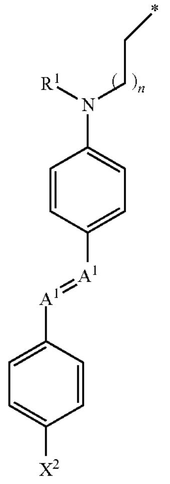
(3-2)
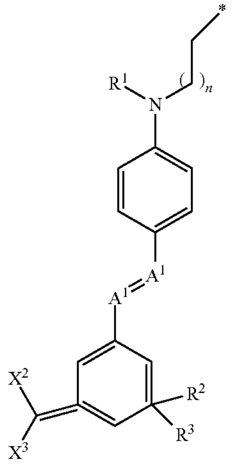
(3-3)
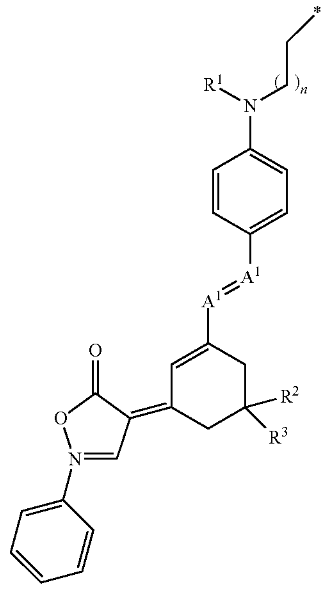
(3-4)
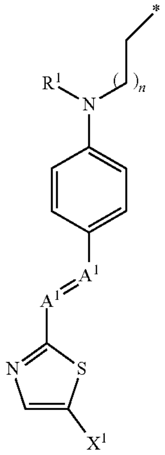
(3-5)
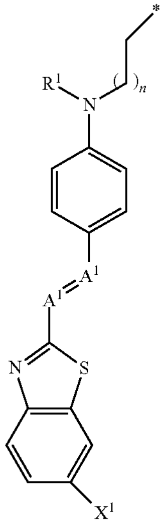
(3-6)
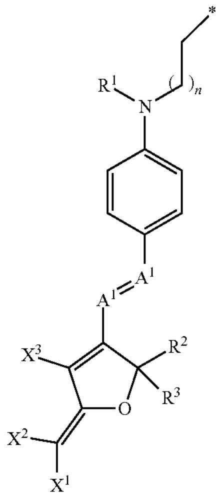

-continued (3-7)

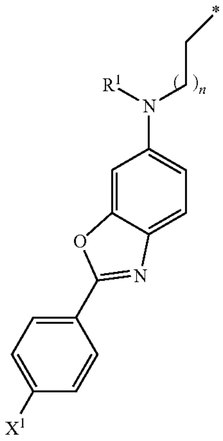

(3-8)

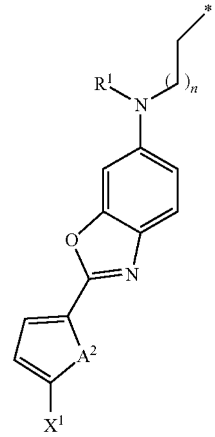

In Chemical Formulae 3-1 to 3-8, $R^1$ to $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ are independently CH or N, $X^1$ to $X^3$ are independently a C1 to C10 alkyl group that is substituted or unsubstituted with $-NO_2$, $-CN$, or a sulfone group ($-SO_2$), $-C(CN)=C(CN_2)$, $R-(C=O)O-$ (wherein R is a substituted or unsubstituted C1 to C10 alkyl group, or a substituted or unsubstituted C6 to C30 aryl group), a halogen element, or a haloalkyl group, and n is one of integers of 1 to 11.

The chromophore functional group may be at least one represented by the following chemical formulae:

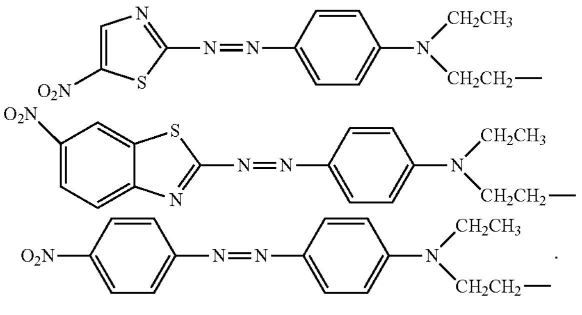

The first polyimide may include a structural unit represented by Chemical Formula 5, and the second polyimide may include a structural unit represented by Chemical Formula 6:

Chemical Formula 5

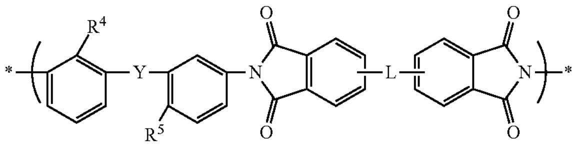

Chemical Formula 6

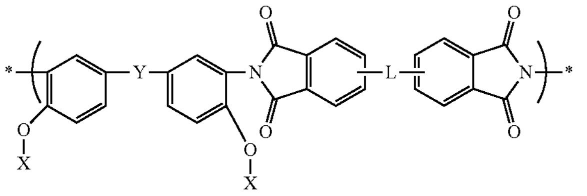

In Chemical Formula 5 and Chemical Formula 6,

Y and L are independently a single bond, or $-O-$, $-S-$, $-(CH_2)_p-$, $-(CF_2)_q-$, $-C(C_nH_{2n+1})_2-$, $-C(C_nF_{2n+1})_2-$, $-(CH_2)_p-C(C_nH_{2n+1})_2-(CH_2)_q-$, $-(CH_2)_p-C(C_nF_{2n+1})_2-(CH_2)_q-$ (wherein $1 \le n \le 10$, $1 \le p \le 10$, and $1 \le q \le 10$), $-C(CF_3)(C_6H_5)-$, $-C(=O)NH-$, or a combination thereof, in Chemical Formula 5, $R^4$ and $R^5$ are independently an unsubstituted C1 to C4 alkyl group, a halogen, a C1 to C4 alkyl group substituted with $-CN$, $-NO_2$, or at least one halogen element, in Chemical Formula 6, each X is represented by one of Chemical Formulae 3-1 to 3-8:

(3-1)

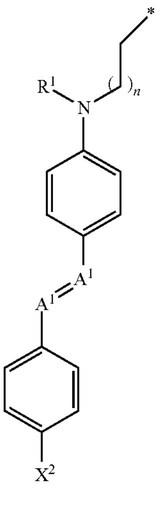

-continued
(3-2)
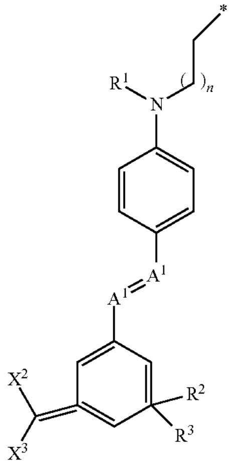
(3-3)
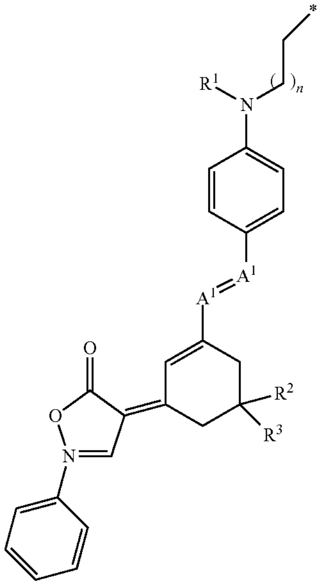
(3-4)
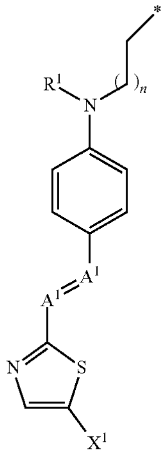
-continued
(3-5)
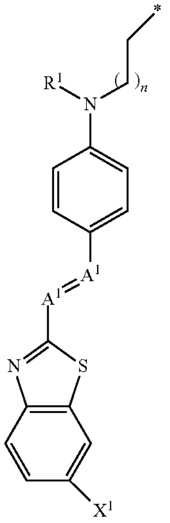
(3-6)
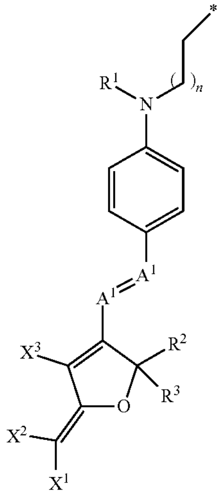
(3-7)
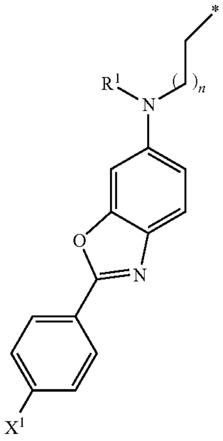

-continued (3-8)

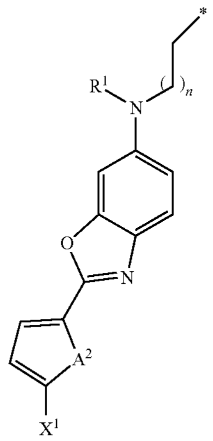

In Chemical Formulae 3-1 to 3-8, $R^1$ to $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$ to $X^3$ are independently a C1 to C10 alkyl group that is substituted or unsubstituted with $-NO_2$, —CN, or a sulfone group ($-SO_2$), $-C(CN)=C(CN_2)$, R—(C=O)O— (wherein R is a substituted or unsubstituted C1 to C10 alkyl group, or a substituted or unsubstituted C6 to C30 aryl group), a halogen element, or a haloalkyl group, and n is one of integers of 1 to 11.

In Chemical Formula 5 and Chemical Formula 6, L may be a single bond, —O—, or $-C(CF_3)_2-$, Y of Chemical Formula 5 may be a single bond, Y of Chemical Formula 6 may be $-C(CF_3)_2-$, X of Chemical Formula 6 may be represented by Chemical Formula 3-1, $A^1$ of Chemical Formula 3-1 may be a nitrogen atom, $R^1$ may be a C1 to C4 alkyl group, and $X^1$ may be a $NO_2$ group.

In another embodiment, an electro-optic material including the composition according to the embodiment is provided.

A glass transition temperature (Tg) of the electro-optic material may be less than or equal to about 300° C.

A content of the chromophore functional group in the electro-optic material may be less than or equal to about 30 weight percent based on a total weight of the electro-optic material.

The electro-optic material may be in the shape of a film.

Another embodiment provides an electro-optic device including the electro-optic material.

The electro-optic device may include an optical waveguide, a phase modulator, a light intensity modulator, a Mach-Zehnder interference system, a beam splitter, a directional coupler, an optical switch, or an X-switch.

Another embodiment provides a method of preparing an electro-optic material including preparing a first polyimide with a weight average molecular weight of greater than or equal to about 100,000 g/mol, preparing a second polyimide having a weight average molecular weight of less than or equal to about 50,000 g/mol and including a structural unit including a chromophore functional group in the side chain, preparing a mixture by mixing the first polyimide and the second polyimide, and curing the mixture.

The composition according to an embodiment is used to prepare an electro-optic material for a variety of applications because the material is formed with a low molecular polyimide grafted with a chromophore functional group having steric hindrance, and thereby, the glass transition temperature of the material may be controlled, and has excellent heat resistance. The composition may be prepared by mixing a polyimide of a low molecular weight, which may be prepared by grafting a variety of chromophore functional groups to any polyimide, e.g., any polyimide of a high molecular weight. The composition may be formed into a molded article such as a film by using various methods known in the art. The molded article may be applied to provide a variety of electro-optic devices using nonlinear optic properties.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
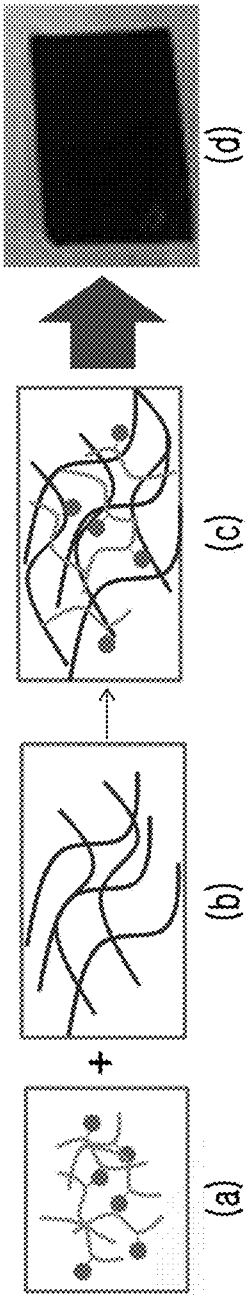
FIG. 1 is a schematic view showing a method of preparing an electro-optic material according to an embodiment.

Exemplary embodiments will hereinafter be described in the detailed description. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Thus, these embodiments are exemplary, the present disclosure is not limited thereto and the present disclosure is defined by the scope of claims.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, “a first element,” “component,” “region,” “layer,” or “section” discussed below could be termed a second element, component, region, layer or section without departing from the teachings herein.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “At least one” is not to be construed as limiting “a” or “an.” “or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a specific definition is not otherwise provided, "substituted" refers to replacement of at least one hydrogen of a given functional group by a substituent selected from a halogen atom (F, Cl, Br, or I), a hydroxy group, a nitro group, a cyano group, an amino group $—NH_2$, $—NH(R^{100})$ or $—N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., cycloalkyl group, etc.), a substituted or unsubstituted aryl group (e.g., benzyl group, naphthyl group, fluorenyl group, etc.), a substituted or unsubstituted alkenyl group, a substituted or unsubstituted alkynyl group, a substituted or unsubstituted heteroaryl group and a substituted or unsubstituted heterocyclic group, or the substituents may be linked with each other to form a ring.

As used herein, when a specific definition is not otherwise provided, "alkyl group" refers to a C1 to C30 alkyl group, and specifically a C1 to C15 alkyl group, "cycloalkyl group" refers to a C3 to C30 cycloalkyl group, and specifically a C3 to C18 cycloalkyl group, "alkoxy group" refers to a C1 to C30 alkoxy group, and specifically a C1 to C18 alkoxy group, "ester group" refers to a C2 to C30 ester group, and specifically a C2 to C18 ester group, "ketone group" refers to a C2 to C30 ketone group, and specifically a C2 to C18 ketone group, "aryl group" refers to a C6 to C30 aryl group, and specifically a C6 to C18 aryl group, and "alkenyl group" refers to a C2 to C30 alkenyl group, and specifically a C2 to C18 alkenyl group.

As used herein, when a specific definition is not otherwise provided, "combination" refers to mixing or copolymerization. Herein, "copolymerization" refers to a random copolymerization, a block copolymerization, or a graft copolymerization.

As used herein, the term "polyimide" refers to "polyimide", "polyamic acid" and a combination thereof as well as "polyimide" itself. The terms "polyimide" and "polyamic acid" may be used to have the same meanings.

In addition, as used herein, "*" refers to a portion of attachment to another atom or other chemical formula.

In order to manufacture an electro-optic device, the use of an organic polymeric nonlinear optic material may have technical or commercial advantages over inorganic materials as the former may have better workability and may be manufactured in lower cost. As described above, as the organic polymeric nonlinear optic material has a lower dielectric constant than an inorganic material such as lithium niobate, the organic polymeric material may provide an optic modulator having a wider bandwidth than the inorganic material. In addition, the organic polymeric nonlinear optic material has excellent nonlinear optic properties that are sufficient to provide merits of a higher switching speed than the inorganic material, a higher bandwidth, an easy optic fiber array contact, and excellent workability. However, though the electro-optic material formed with an organic polymeric material may have overall better performance characteristics than an electro-optic material formed with an inorganic material such as lithium niobate, the organic polymeric material is likely to have associated disadvantages as well related to thermal stability, and relatively large optic transmission losses. To minimize such disadvantages many have suggested ways to address these shortcomings.

In one such instance, a chromophore is grafted to an organic polymeric material having nonlinear optic properties. However, most organic polymers exhibit characteristics in which the chromophore transitions to a uniform arrangement to an irregular arrangement at a high temperature over time due to the low thermal resist properties of the polymer. Accordingly, a chromophore that demonstrates high temperature characteristics is grafted to an acryl-based polymer, but such a grafted material has technical limits due to the low thermal resist characteristics of the polymer. Moreover, in the case of polyimides it may be difficult to graft a chromophore to a polyimide as well as difficult to form a layer, such as, a film from the grafted polyimide.

In another instance, one can prepare a chromophore-introduced polyimide whereby the method includes forming a polyimide from a diamine (or dianhydride) including a chromophore and a dianhydride (or diamine). However, what one finds is that the chromophore-introduced diamine or dianhydride has a very low reactivity ratio compared to the other monomeric components in the polymerization mixture due to a steric hindrance of the chromophore, and therefore, it can be difficult to polymerize a polyimide having a high molecular weight as well as a polyimide with sufficient chromophore content. This can lead to not only brittle films because of the lower molecular weight, but also low content of chromophore, and therefore, poor electro-optic properties.

Our research efforts seek to provide an electro-optic material with acceptable processability, i.e., capable of being easily filmed, and possesses sufficient amount of chromophore, excellent heat resistance (or thermal stability), and with extended sustainable electron optic properties. The electro-optic material is easily prepared, and can be applied for a variety of electro-optic devices. We can achieve one or more of the desired characteristics of an electro-optic material by mixing a polyimide having a relatively low molecular weight to which a chromophore functional group is included as a side chain, and a polyimide of a high molecular weight having no chromophore functional group to provide an electro-optic material.

Accordingly, an embodiment provides a composition for an electro-optic material including a first polyimide having a high molecular weight and not including a chromophore, and a second polyimide having a lower molecular weight than the first polyimide including a structural unit including a chromophore functional group as a side chain.

The weight average molecular weight of the first polyimide may be greater than or equal to about 100,000 g/mol, for example, greater than or equal to about 105,000 g/mol, greater than or equal to about 110,000 g/mol, greater than or equal to about 115,000 g/mol, greater than or equal to about 120,000 g/mol, greater than or equal to about 125,000 (g/mol, greater than or equal to about 130,000 g/mol, greater than or equal to about 135,000 g/mol, greater than or equal to about 140,000 g/mol, greater than or equal to about 145,000 g/mol, greater than or equal to about 150,000 g/mol, greater than or equal to about 155,000 g/mol, greater than or equal to about 160,000 g/mol, greater than or equal to about 165,000 g/mol, greater than or equal to about 170,000 g/mol, greater than or equal to about 175,000 g/mol, greater than or equal to about 180,000 g/mol, greater than or equal to about 185,0000 g/mol, greater than or equal to about 190,000 g/mol, greater than or equal to about 195,000 g/mol, or greater than or equal to about 200,000 g/mol, but is not limited thereto.

The weight average molecular weight of the second polyimide may be less than or equal to about 50,000 g/mol, less than or equal to about 49,000 g/mol, less than or equal to about 48,000 g/mol, less than or equal to about 47,000 g/mol, less than or equal to about 46,000 g/mol, less than or equal to about 45,000 g/mol, less than or equal to about 44,000 g/mol, less than or equal to about 43,000 g/mol, less than or equal to about 42,000 g/mol, less than or equal to about 41,000 g/mol, less than or equal to about 40,000 g/mol, less than or equal to about 39,000 g/mol, less than or equal to about 38,000 g/mol, less than or equal to about 37,000 g/mol, less than or equal to about 36,000 g/mol, less than or equal to about 35,000 g/mol, less than or equal to about 30,000 g/mol, less than or equal to about 29,000 g/mol, less than or equal to about 28,000 g/mol, less than or equal to about 27,000 g/mol, less than or equal to about 26,000 g/mol, less than or equal to about 25,000 g/mol, less than or equal to about 24,000 g/mol, less than or equal to about 23,000 g/mol, less than or equal to about 22,000 g/mol, less than or equal to about 21,000 g/mol, or less than or equal to about 20,000 g/mol, but is not limited thereto.

In an embodiment, the weight average molecular weight of the first polyimide may be about 100,000 g/mol to about 150,000 g/mol, for example, about 100,000 g/mol to about 140,000 g/mol, about 100,000 g/mol to about 135,000 g/mol, about 100,000 g/mol to about 130,000 g/mol, about 100,000 g/mol to about 125,000 g/mol, about 100,000 g/mol to about 120,000 g/mol, about 105,000 g/mol to about 120,000 g/mol, or about 110,000 g/mol to about 120,000 g/mol, but is not limited thereto.

In an embodiment, the weight average molecular weight of the second polyimide may be about 10,000 g/mol to about 50,000 g/mol, for example, about 15,000 g/mol to about 40,000 g/mol, about 15,000 g/mol to about 35,000 g/mol, about 15,000 g/mol to about 30,000 g/mol, about 15,000 g/mol to about 25,000 g/mol, about 18,000 g/mol to about 25,000 g/mol, about 18,000 g/mol to about 24,000 g/mol, about 19,000 g/mol to about 23,000 g/mol, about 20,000 g/mol to about 23,000 g/mol but is not limited thereto.

In an embodiment, the weight average molecular weight of the first polyimide may be about 100,000 g/mol to about 120,000 g/mol, for example, about 105,000 g/mol to about 120,000 g/mol, or about 110,000 g/mol to about 120,000 g/mol, and the weight average molecular weight of the second polyimide may be about 18,000 g/mol to about 25,000 g/mol, for example, about 19,000 g/mol to about 23,000 g/mol, or about 20,000 g/mol to about 23,000 g/mol, but they are not limited thereto.

As described above, polyimide including a chromophore is difficult to polymerize into a polyimide having a high molecular weight due to steric hindrance of chromophore. In contrast, and according to an embodiment, a polyimide having a low molecular weight, for example, a weight average molecular weight of less than or equal to about 50,000 g/mole, having a chromophore side chain is more readily prepared, This low molecular weight polyimide is then mixed with a high molecular weight polyimide without chromophore, for example, a weight average molecular weight of greater than or equal to about 100,000 g/mol. so as to provide a material that includes a sufficient amount of chromophore, has electro-optic properties, and can be readily processed into a film with a high heat resistance.

In an embodiment, the structural unit including the chromophore functional group side chain may be included in an amount of less than about 50 weight percent (wt %) based on a total weight of the first polyimide and the second polyimide. For example, the structural unit including the chromophore functional group side chain may be included in an amount of about 1 wt % to about 50 wt %, for example, about 1 wt % to about 45 wt %, about 1 wt % to about 40 wt %, about 1 wt % to about 35 wt %, about 1 wt % to about 30 wt %, about 1 wt % to about 25 wt %, about 2.5 wt % to about 30 wt %, about 2.5 wt % to about 25 wt %, about 5 wt % to about 30 wt %, or about 5 wt % to about 25 wt % based on a total weight of the first polyimide and the second polyimide, but is mot limited thereto.

As described above, when the chromophore functional group is introduced into at least one of diamine or dianhydride, and the chromophore functional group-introduced diamine and dianhydride are polymerized to provide a polyimide, the obtained polyimide may include a sufficient amount of chromophore functional groups, for example, in at least 50 percent to 100%, preferably 50 percent to 80 percent, of the structural units of the polyimide. But, in this case, due to a steric hindrance of the chromophore functional group, and its corresponding low reactivity ratio, the weight average molecular weight of the obtained polyimide is about 20,000 gram/mol, and a polyimide having such a low weight average molecular weight is likely to have poor film processing properties resulting in brittleness.

As understood from the later-described Examples, if one sets out to prepare a polyimide having a high molecular weight, for example, a weight average molecular weight of greater than or equal to about 100,000 g/mol, the polymerization reaction may be performed only by adjusting a content of a monomer including the chromophore functional group to relatively small amounts, e.g., to about less than or equal to about 12.5 mole percent (mol %) based on the total moles of respective structural units of the polyimide. Accordingly, in the resulting polyimide with the chromophore functional group-including monomer within the above mole percent range, the content of the chromophore functional group itself may be as low as about 10 wt % based on the weight of the entire polyimide. When the chromophore functional group is included in the above range of content, and the molecular weight of the obtained polyimide is further lowered, and resulting molecular weight of the polyimide may be gradually decreased thereby increasing the amount of the chromophore functional group, and one may exhibit poor film processing performance.

However, according to an embodiment, a polyimide can be filmed, and the obtained polyimide film is not brittle even if the polyimide is prepared by mixing a first polyimide having a high weight average molecular weight, for example, a weight average molecular weight of greater than or equal to about 100,000 g/mol and including no chromophore functional group, and a second polyimide having a lower molecular weight, for example, a weight average molecular weight of less than or equal to about 50,000 g/mol and including chromophore functional groups in most is not all side chains of the structural unit. For example, the first polyimide and the second polyimide may be present in the mixture at a weight ratio of about 50:50. When the first polyimide and the second polyimide are mixed at a weight ratio of about 50:50, the content of a monomer including the chromophore functional group is greater than or equal to at least about 25 wt % of the total weight of the entire monomer for providing the first polyimide and the second polyimide. Specifically, if the types of monomers for providing the first polyimide and the second polyimide are the same as each other except that one of the monomers used to prepare the second polyimide includes chromophore functional groups on the side chain, the content of the monomer for preparing the first polyimide including no chromophore functional group is about 50 wt % of the entire monomer weight, and the other 50 wt % is for the monomer for preparing the second polyimide as the first polyimide and the second polyimide are mixed at a weight ratio of about 50:50, wherein a portion of or all of the monomer for preparing the second polyimide may include the chromophore functional group.

In an embodiment, for the second polyimide the chromophore functional group is introduced with the diamine monomer (not the dianhydride monomer), and the diamine and the dianhydride should have similar molecular weights so the weight ratio of diamine and dianhydride are reacted at a mole ratio of about 1:1, when not considering the weight of the chromophore functional group. Accordingly, although not considering the weight of the chromophore functional group introduced into diamine, the weight ratio of diamine and dianhydride for preparing the second polyimide is about 1:1, so the content of the monomer including the chromophore functional group is greater than or equal to at least about 25 wt % based on the total weight of the entire monomer when the first polyimide and the second polyimide are mixed at a weight ratio of about 50:50, and it may increase up to greater than or equal to at least about 30 wt % if considering the weight of the chromophore functional group. As in above, even when the film is manufactured from the composition prepared by mixing the first polyimide and the second polyimide with increasing the monomer including the chromophore functional group in greater than or equal to about 25 wt % or up to about 30 wt % based on the total weight of the entire monomers according to an embodiment, it may be filmed, and the obtained film is not brittle. In other words, when the film is manufactured by mixing the first polyimide having a high molecular weight and the second polyimide having a lower molecular weight and including the chromophore functional group in the side chain, the content of the structural unit including the chromophore functional group may be increased in amounts greater than or equal to about 2 times of the maximum amount (less than about 10 wt %) of the structural unit including the maximum chromophore functional group introduced in the film when the film is directly manufactured by polymerizing the conventional chromophore functional group-introduced diamine and dianhydride as noted above.

An electro-optic material is prepared from the composition described above, and the material is readily filmed from the composition without brittle phenomenon. Moreover, the overall content of chromophore may be readily increased to a more desired range for electro-optic properties. Thus, an electro-optic material having desirable electro-optic properties may be prepared from the composition according to an embodiment.

In addition, the content of the structural unit including the chromophore functional group in the composition may be readily controlled by adjusting contents of the first polyimide and the second polyimide in the mixture. For example, if one desires to increase the content of chromophore in the obtained electro-optic material, one can increase the content of the second polyimide including the chromophore functional group relative to the amount of the first polyimide. On the contrary, if one desires to lower the content of chromophore in the obtained electro-optic material, one can increase the amount of the first polyimide relative to the amount of the second polyimide. Thus, the content of the first polyimide and the second polyimide in the composition according to an embodiment may be readily adjusted considering the desirable amount range of the chromophore in the electro-optic material to be prepared.

The second polyimide, which is the polyimide including a structural unit including a chromophore functional group in the side chain, may be polymerized from a monomer having a chromophore functional group in at least one side chain of a diamine or a dianhydride. Moreover, both a diamine and a dianhydride may include chromophore functional groups in the side chains, or the chromophore functional group may be included in only either a side chain of diamine or a side chain of dianhydride. As noted above, generally, the group chromophore is a relatively large moiety in terms of its steric volume so the second polyimide is more likely to be prepared from the monomer including the chromophore functional group in only one side chain of either the diamine or the dianhydride.

In an embodiment, the chromophore functional group may be included in the side chain of diamine for preparing the second polyimide. In an embodiment, if the second polyimide is prepared by polymerizing a diamine including a chromophore functional group in the side chain and a dianhydride including no chromophore functional group, the second polyimide may include at least one chromophore functional group in nearly all or all of the imide structural units. Diamine and dianhydride may include each one chromophore functional group or may include at least 2 chromophore functional groups. Accordingly, an ordinary skilled person in the art may readily control the content of chromophore to be included in the electro-optic material by adjusting a mixing ratio of the first polyimide and the second polyimide considering the content of chromophore function group in the second polyimide.

In an embodiment, the first polyimide and the second polyimide may be mixed in a weight ratio of about 99:1 to about 50:50. For example, the first polyimide and the second polyimide may be mixed in a weight ratio of about 95:5 to about 50:50, for example, about 90:10 to about 50:50, about 80:20 to about 50:50, about 75:25 to about 50:50, about 70:30 to about 50:50, about 65:35 to about 50:50, about 60:40 to about 50:50, or about 55:45 to about 50:50, but are not limited thereto.

By including the first polyimide and the second polyimide at the mentioned ratio in the composition, the composition according to an embodiment may be readily filmed, and the obtained film may have a high glass transition temperature and also have a high heat resistance.

As understood from Examples, which are described later, as the content of the first polyimide, which is the high molecular weight polyimide including no chromophore functional group, is increased, the glass transition temperature of the electro-optic material will also increase. Also, as the content of the low molecular weight second polyimide including the chromophore functional group in the side chain is increased, the glass transition temperature of the electro-optic material will decrease. Generally, the polyimide is known to have a high glass transition temperature of greater than or equal to about 300° C., so to have a high heat resistance.

In some instances, however, an electro-optic material including a chromophore functional group, the film may be heated at a temperature of greater than or equal to about 300° C., e.g., in a poling process for arranging chromophore after manufacturing a film when the glass transition temperature is greater than or equal to about 300° C., which can result in degradation of the chromophore. Accordingly, the glass transition temperature of the film when manufacturing the electro-optic material may be less than or equal to about 300° C., and therefore, provides a greater processing temperature window. The glass transition temperature of the composition according to an embodiment may be readily controlled by adjusting the contents of the first polyimide and the second polyimide. The electro-optic material having a glass transition temperature of less than or equal to about 300° C., for example, the electro-optic material having a glass transition temperature of about 250° C. to about 300° C. may be easily prepared by adjusting the contents of the first polyimide and the second polyimide.

The first polyimide and the second polyimide may be used by selecting any polyimide known in the field pertaining to the art, and the type of polyimide is not particularly limited. The first polyimide and the second polyimide may be easily prepared by an ordinary skilled person in the art using the known monomer and any known method in the art or may be selected from the commercially available polyimide in the market. In addition, the type of chromophore included in the second polyimide may also be selected and used without limits from the various types of the chromophores known in the fields pertaining to the arts. As a method of introducing a chromophore into the second polyimide, the ordinary skilled person in the art may well know a method of introducing chromophore into diamine and/or dianhydride and a method of polymerizing the diamine and/or dianhydride introduced with chromophore to provide polyimide are widely known to an ordinary skilled person in the art, and the second polyimide introduced with the chromophore functional group in the side chain may be easily prepared by using known various methods. Examples and Comparative Examples, which are described later, disclose a method of preparing a polyimide by introducing a chromophore into diamine, and then polymerizing the same with dianhydride, and the method is well known to the ordinary skilled person in the art.

In an embodiment, the first polyimide may include a structural unit represented by Chemical Formula 1, and the second polyimide may include a structural unit represented by Chemical Formula 2:

Chemical Formula 1

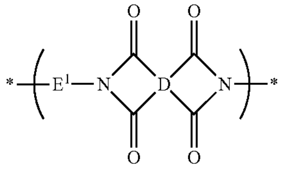

-continued

Chemical Formula 2

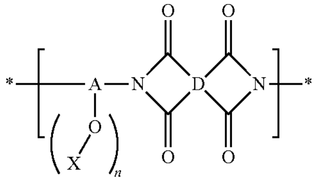

In Chemical Formula 1 and Chemical Formula 2,

D is a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, $E^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, A is a substituted or unsubstituted C4 to C30 alicyclic organic group, a substituted or unsubstituted C6 to C30 aromatic organic group, or a substituted or unsubstituted C4 to C30 heteroaromatic organic group, or a combination thereof, in D, $E^1$, and A, the alicyclic organic group, the aromatic organic group, the heteroaromatic organic group, or the combination thereof is a single ring, a condensed ring in which at least two rings are fused, or at least two rings selected from the single ring and the condensed ring which are linked by a single bond, a fluorenylene group, —O—, —S—, —C(═O)—, —CH(OH)—, $—S(═O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein $1 \le n \le 10$, $1 \le p \le 10$, and $1 \le q \le 10$), $—C(CF_3)(C_6H_5)—$, —C(═O)NH—, or a combination thereof, X is a chromophore functional group, and n in Chemical Formula 2 is an integer of 1 to 4.

D of Chemical Formula 1 and Chemical Formula 2 may be the same or different groups.

In an embodiment, D of Chemical Formula 1 and Chemical Formula 2 may independently be selected from chemical formulae represented by Group 1:

Group 1

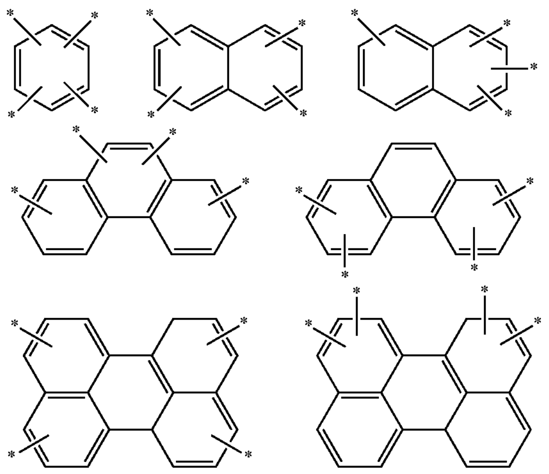

-continued

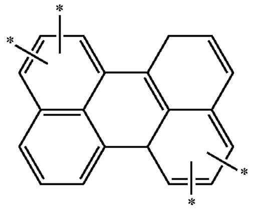
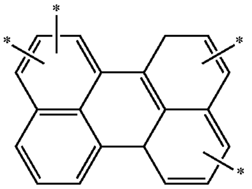
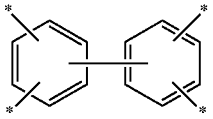
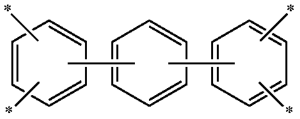
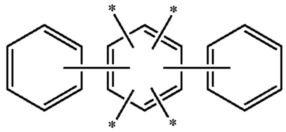
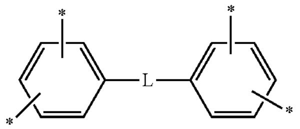
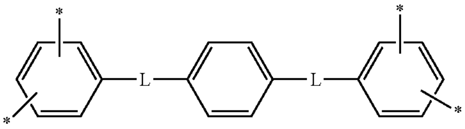
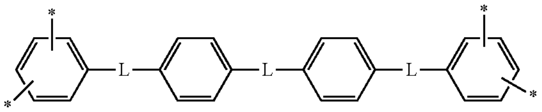
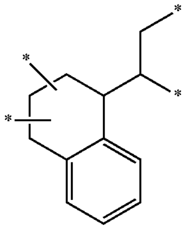
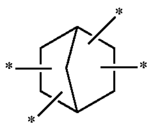
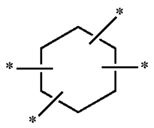
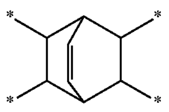
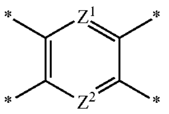
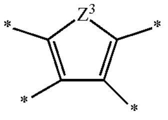

In the above chemical formulae, each moiety may be substituted or unsubstituted and each L may be the same or different and may independently be a single bond, a fluorenylene group, —O—, —S—, —C(=O)—, —CH(OH)—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein $1 \leq n \leq 10$, $1 \leq p \leq 10$, and $1 \leq q \leq 10$), —C(CF$_3$)(C$_6$H$_5$)—, or —C(=O)NH—, and

* is a linking portion with an adjacent atom, $Z^1$ and $Z^2$ may be each the same or different and may independently be —N= or —C(R$^{100}$)=, wherein R$^{100}$ is hydrogen or a C1 to C5 alkyl group and $Z^1$ and $Z^2$ are not simultaneously —C(R$^{100}$)=, and $Z^3$ is —O—, —S—, or —NR$^{101}$—, wherein R$^{101}$ is hydrogen or a C1 to C5 alkyl group.

In addition, D of Chemical Formula 1 and Chemical Formula 2 may be independently selected from chemical formulae of Group 2, but is not limited thereto:

Group 2

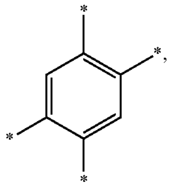
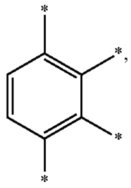
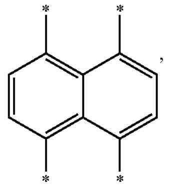
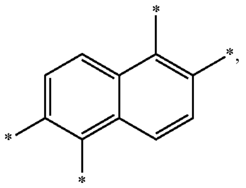
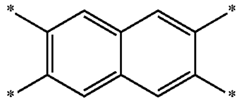
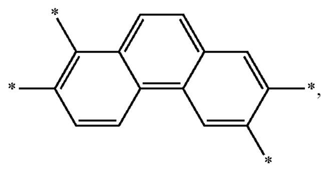
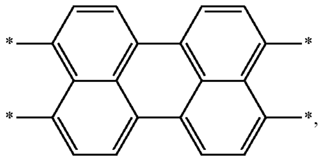
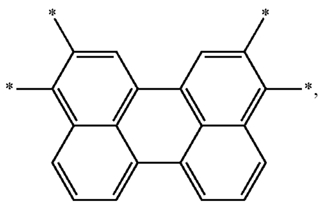
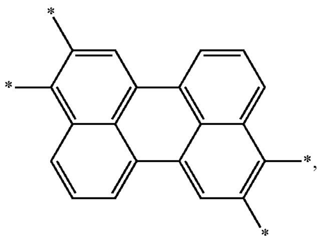
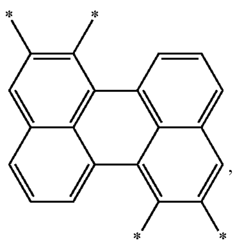
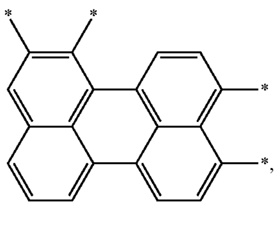
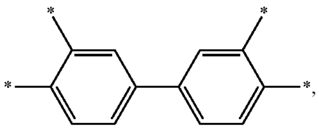
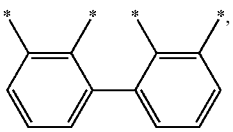

-continued
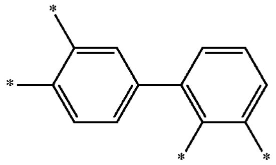
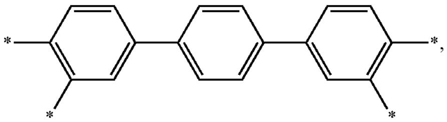
,
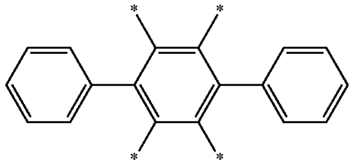
,
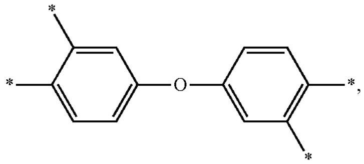
,
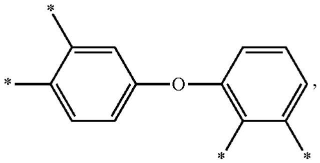
,
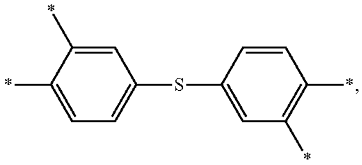
,
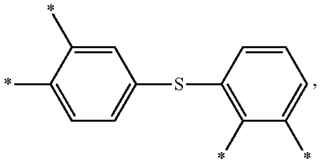
,
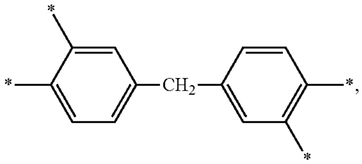
,
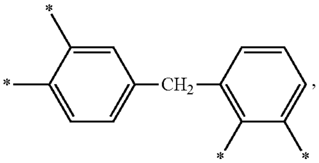
,
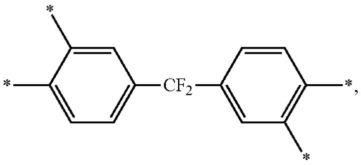
,
-continued
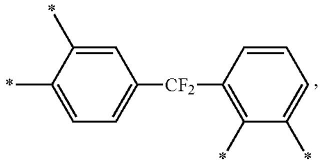
,
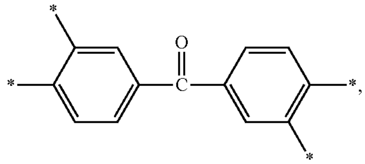
,
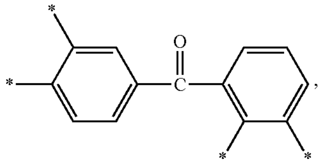
,
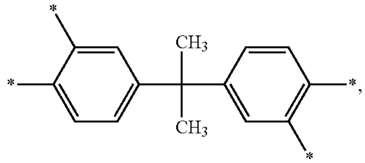
,
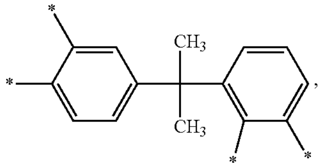
,
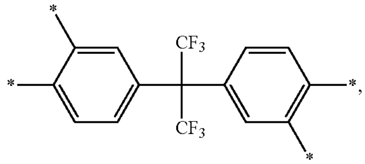
,
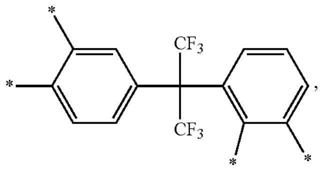
,
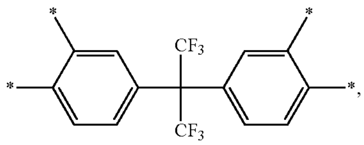
,
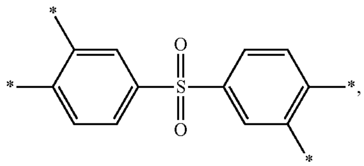
,
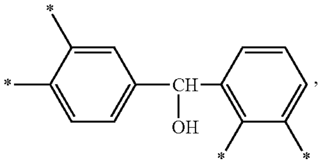
, -continued

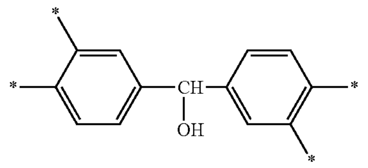

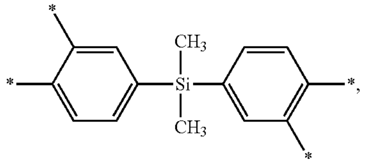
,

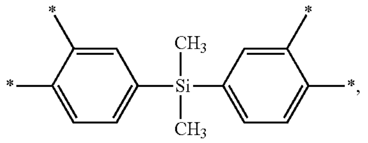
,

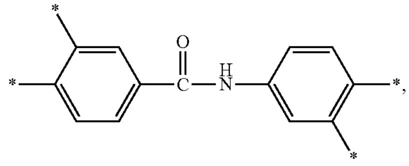
,

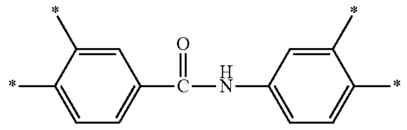

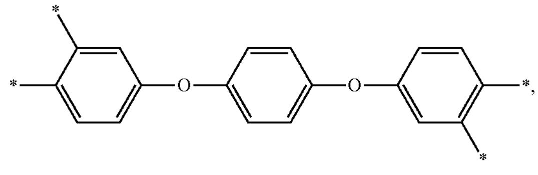
,

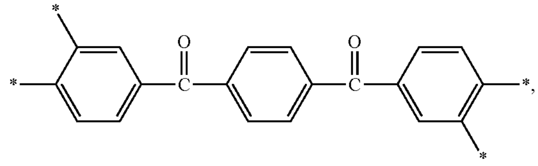
,

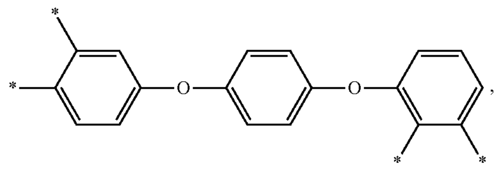
,

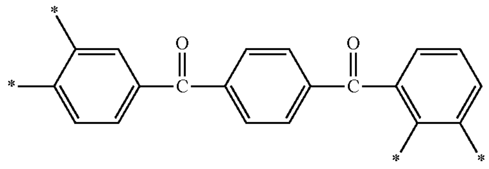
,

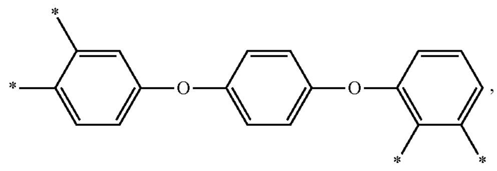
,

-continued

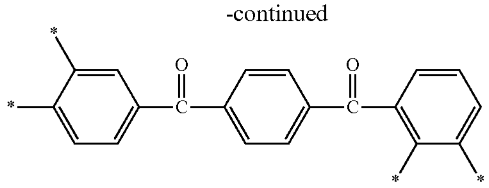
,

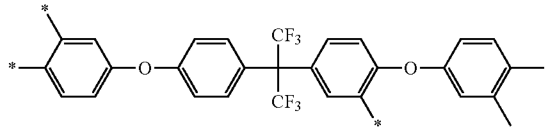
,

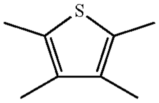
,

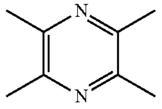
,

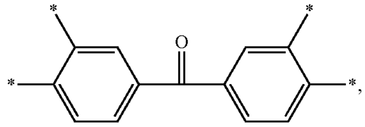
,

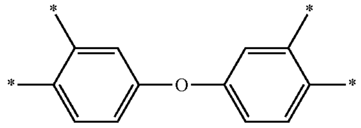

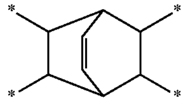

In an embodiment, D of Chemical Formula 1 and Chemical Formula 2 may be a group in which two phenylene groups are linked by —O—.

In an embodiment, $E^1$ of Chemical Formula 1 and A of Chemical Formula 2 may independently be a substituted or unsubstituted C6 to C30 aromatic single ring, a C10 to C30 condensed ring in which at least two substituted or unsubstituted aromatic rings are fused, or at least two aromatic rings selected from the single ring and the condensed ring which are linked by a single bond, or —O—, —S—, —C(═O)—, —CH(OH)—, $—S(═O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein $1≤n≤10$, $1≤p≤10$, and $1≤q≤10$), $—C(CF_3)(C_6H_5)—$, —C(═O)NH—, or a combination thereof. For example, $E^1$ of Chemical Formula 1 and A of Chemical Formula 2 may independently be a group in which substituted or unsubstituted two phenylene groups are linked by a single bond, or —O—, —S—, $—(CH_2)_p—$, $—(CF_2)_q—$, $—C(C_nH_{2n+1})_2—$, $—C(C_nF_{2n+1})_2—$ (wherein, $1≤n≤10$, $1≤p≤10$, and $1≤q≤10$), or a combination thereof, and —(O—X)x linked with A of Chemical Formula 2 may include the two phenylene groups with which each —O—X is linked.

In an embodiment, $E^1$ of Chemical Formula 1 may be a group in which the two phenylene groups each substituted with an electron-withdrawing group, for example, a haloalkyl group, for example, a trifluoromethyl group are linked by a single bond, and A of Chemical Formula 2 may be a group in which unsubstituted two phenylene groups are linked by a $—C(CF_3)_2—$ group.

In an embodiment, the structural unit represented by Chemical Formula 1 may be represented by Chemical Formula 1-1:

Chemical Formula 1-1

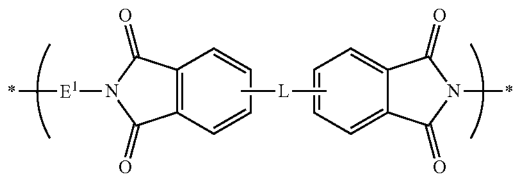

In Chemical Formula 1-1,

L is a single bond, or —O—, —$C(C_nF_{2n+1})_2$— (wherein $1 \le n \le 10$), or a combination thereof, and $E^1$ may be represented by Chemical Formula 7:

Chemical Formula 7

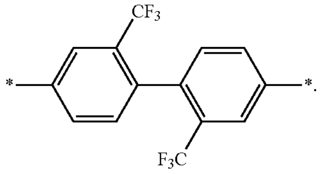

In an embodiment, —$(O—X)_x$ linked with A of Chemical Formula 2 may be linked to at least one of the alicyclic ring, aromatic ring, or heteroaromatic ring, respectively when the A is at least two alicyclic rings, at least two aromatic rings, or at least two heteroaromatic rings. For example, when A in Chemical Formula 2 is a substituted or unsubstituted biphenylene group, each phenylene group of the substituted or unsubstituted biphenylene group may be connected with one or two —(O—X), or only one phenylene group may be connected with one or two phenylene groups. But, it is not limited thereto, but the group of —(O—X) is supposed to be included in 1 to 4 in the structural unit represented by Chemical Formula 2, and it may be bonded in a variety of numbers and the various positions according to a form of the A group.

In an embodiment, the first polyimide of the composition may include a structural unit represented by Chemical Formula 5, and the second polyimide may include a structural unit represented by Chemical Formula 6:

Chemical Formula 5

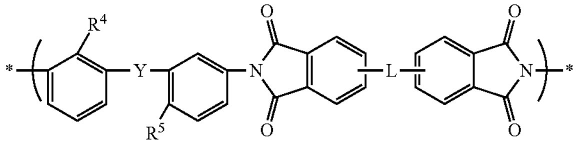

Chemical Formula 6

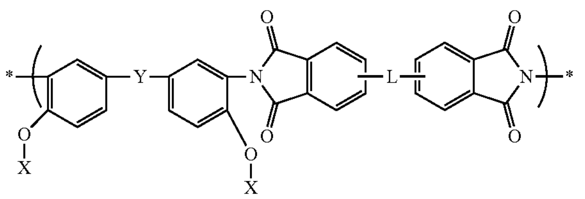

In Chemical Formula 5 and Chemical Formula 6,

Y and L are independently a single bond, or —O—, —S—, —$(CH_2)_p$—, —$(CF_2)_q$—, —$C(C_nH_{2n+1})_2$—, —$C(C_nF_{2n+1})_2$—, —$(CH_2)_p$—$C(C_nH_{2n+1})_2$—$(CH_2)_q$—, —$(CH_2)_p$—$C(C_nF_{2n+1})_2$—$(CH_2)_q$— (wherein $1 \le n \le 10$, $1 \le p \le 10$, and $1 \le q \le 10$), —$C(CF_3)(C_6H_5)$—, —C(=O)NH—, or a combination thereof, in Chemical Formula 5, $R^4$ and $R^5$ are independently an unsubstituted C1 to C4 alkyl group, a halogen, —CN, —$NO_2$, or a C1 to C4 alkyl group substituted with at least one halogen element, In Chemical Formula 6, each X is represented by the chromophore functional group.

In an embodiment, L of Chemical Formula 5 and Chemical Formula 6 may independently be a single bond, —O—, —$C(C_nF_{2n+1})_2$— (wherein n is 1), or a combination thereof, Y of Chemical Formula 5 may be a single bond, and Y of Chemical Formula 6 may be —$C(CF_3)_2$—.

As described above, the composition according to an embodiment may include any known chromophore functional group in a side chain of the second polyimide. In order to show a high nonlinearity for being applied as the electro-optic material, it is known to have a shape capable of occurring a partial electron polarization in a molecule. The molecule has a high dipole moment, and also it is appropriate that a strong electron donor and an electron acceptor are present at both terminal ends of the molecule. In addition, for facilitating electrons to transfer between the electron donor and the electron acceptor, in other words, for freely transferring pi electrons, it may be lengthy connected in double bonds or triple bonds between the electron donor and the electron acceptor. Furthermore, when this connection is stably present on one plane, it is known that the effects may be further enhanced. Lots of chromophore functional groups having the structure are disclosed in the fields pertaining to the arts, and the second polyimide in the composition according to an embodiment may be prepared by freely selecting the disclosed chromophore functional groups. In other words, the selected chromophore functional group is bonded to diamine or dianhydride for preparing the second polyimide, and then the monomer including the same is polymerized using the known polyimide polymerization to provide the second polyimide. The method of bonding the selected chromophore functional group with a monomer for preparing polyimide, for example, diamine may be performed using a variety of methods known for the ordinary skilled person in the art. For example, the chromophore functional group is present in a form of a compound having hydroxyl group at a terminal end before being bonded to the diamine, and the diamine is also substituted with at least one hydroxyl group, so that hydroxyl groups of the two compounds form an ether bond due to a dehydration condensation reaction to bond the chromophore functional group to the diamine. The second polyimide may be prepared by polymerizing a diamine introduced with the chromophore functional group with a dianhydride as in the general method of preparing polyimide. The method is well known to the ordinary skilled person in the art, and the chromophore functional group may be bonded to a monomer for preparing polyimide according to the various methods besides the method.

In an embodiment, the chromophore functional group may be at least one of Chemical Formulae 3-1 to 3-8:

(3-1)
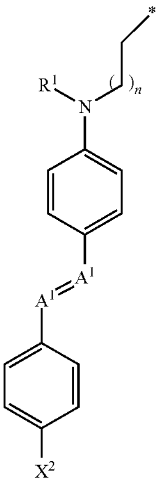
(3-2)
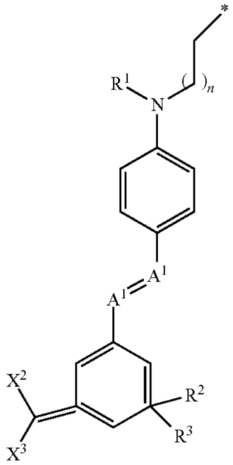
(3-3)
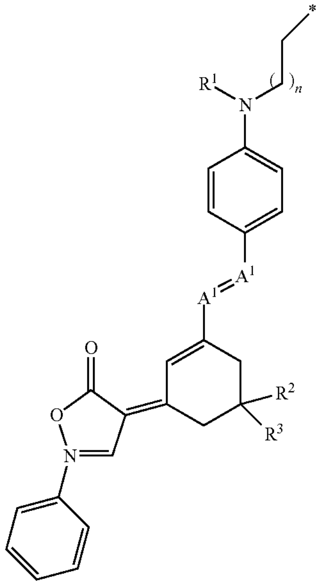
-continued
(3-4)
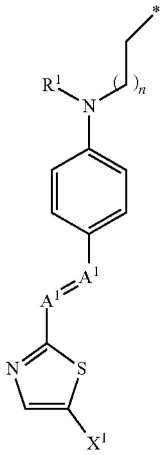
(3-5)
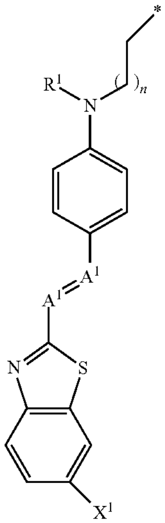
(3-6)
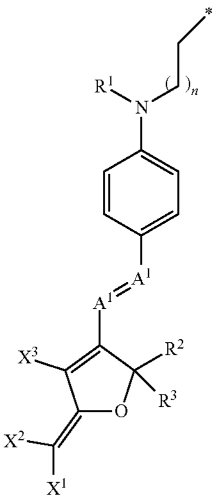

-continued (3-7)

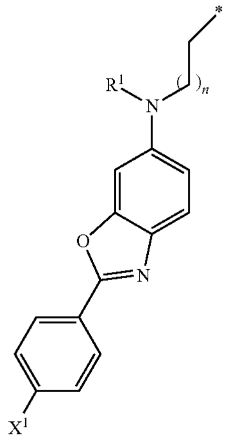

(3-8)

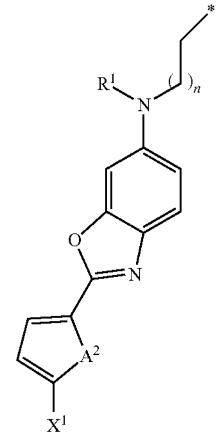

In Chemical Formulae 3-1 to 3-8, $R^1$ to $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$ to $X^3$ are independently a C1 to C10 alkyl group that is substituted or unsubstituted with $-NO_2$, —CN, or a sulfone group ($-SO_2$), $-C(CN)=C(CN_2)$, R—(C=O)O— (wherein R is a substituted or unsubstituted C1 to C10 alkyl group, or a substituted or unsubstituted C6 to C30 aryl group), a halogen element, or a haloalkyl group, n is one of integers of 1 to 11, and

* is a linking portion with diamine or dianhydride for forming the second polyimide.

In an embodiment, the chromophore functional group may be at least one of Chemical Formula 3-1, 3-2, 3-4, or 3-5, for example, at least one of the following chemical formulae:

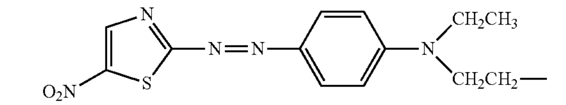

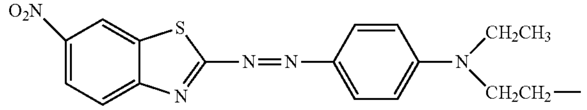

-continued

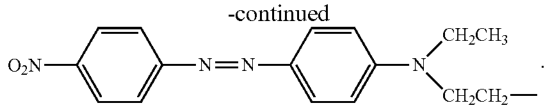

In an embodiment, the chromophore functional group may be derived from Disperse red1 represented by Chemical Formula 3-1 wherein $A^1$ of Chemical Formula 3-1 may be a nitrogen atom, $R^1$ may be an ethyl group, $X^1$ may be a $NO_2$ group, and n may be 2.

As described above, the first polyimide and the second polyimide may be prepared by polymerizing a diamine, and a dianhydride or diisocyanate compound in an organic solvent as well known to an ordinary skilled person in the art. The diamine, dianhydride or diisocyanate are not limited to the particular compounds, but may be appropriately selected from any diamine, dianhydride or diisocyanate compounds as long as the compounds provide a polyimide having appropriate optic properties and mechanical properties.

Examples of the diamine compound may be hexamethylene diamine; m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis (4-aminophenyl) ether; bis(3-aminophenyl) ether; bis(4-aminophenyl)diethyl silane; bis(4-aminophenyl)diphenyl silane; bis(4-aminophenyl)ethyl phosphine oxide; bis(4-aminophenyl)phenyl phosphine oxide; bis(4-aminophenyl)-N-phenyl amine; bis(4-aminophenyl)-N-methylamine; 1,2-diamino-naphthalene; 1,4-diamino-naphthalene, 1,5-diamino-naphthalene, 1,6-diamino-naphthalene; 1,7-diamino-naphthalene, 1,8-diamino-naphthalene, 2,3-diamino-naphthalene; 2,6-diamino-naphthalene; 1,4-diamino-2-methyl-naphthalene; 1,5-diamino-2-methyl-naphthalene, 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 3,3'-dimethyl-4,4'-diamino-biphenyl; 3,3'-dimethoxy-4,4'-diamino-biphenyl; 4,4'-bis(4-aminophenoxy)-biphenyl; 2,4-diamino-toluene, 2,5-diamino-toluene; 2,6-diamino-toluene; 3,5-diamino-toluene; 1,3-diamino-2,5-dichloro-benzene, 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene, 1,4-bis (2-methyl-4-amino-pentyl)-benzene; 1,4-bis(1,1-dimethyl-5-amino-pentyl)-benzene; 1,4-bis(4-aminophenoxy)-benzene, o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantine; bis[2-(3-aminophenyl) hexafluoroisopropyl] diphenyl ether; 3,3'-diamino-1,1,1'-diadamantane, N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane, 1,4-bis(3-aminophenyl)buta-1-ene-3-yne, 1,3-bis(3-aminophenyl) hexafluoropropane; 1,5-bis(3-aminophenyl) decafluoropentane; and 4,4'-bis[2-(4- aminophenoxyphenyl)hexafluoroisopropyl]diphenyl ether, diaminocyclohexane, bicyclohexyldiamine, 4,4'-diaminocyclohexylmethane, and diaminofluorene, and the like. These compounds may be used alone or in combination of two or more thereof, and are not limited to these types. Such diamine compounds are commercially available or may be synthesized by known methods.

For example, the diamine may be a compound having the following structure:

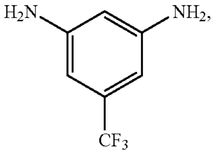
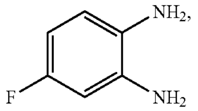
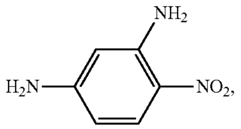
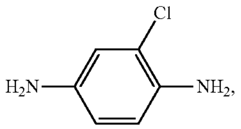
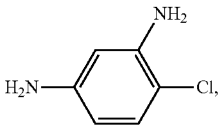
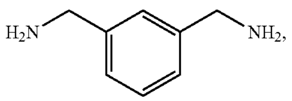
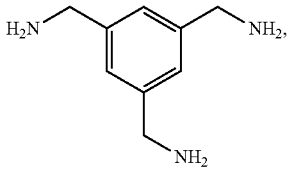
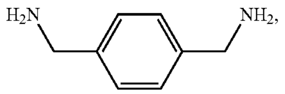
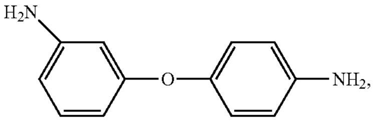
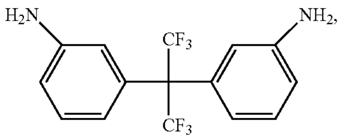
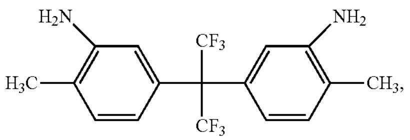
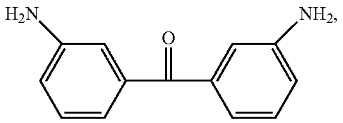
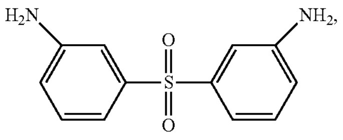

-continued

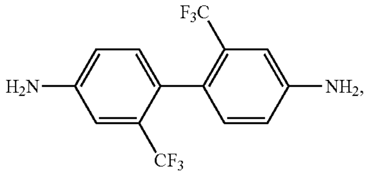
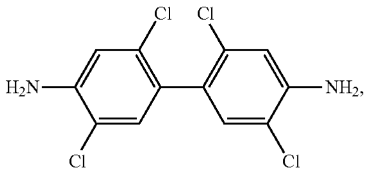
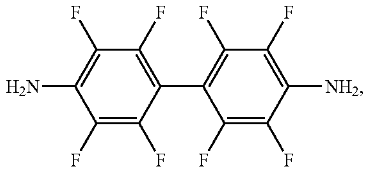
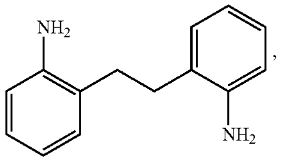
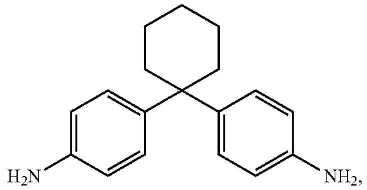
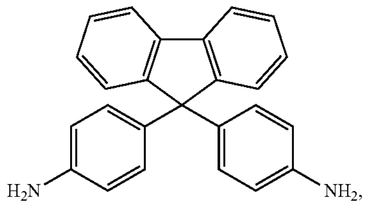
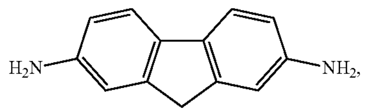
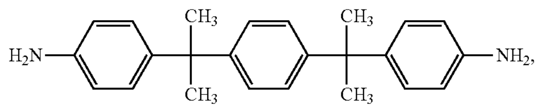
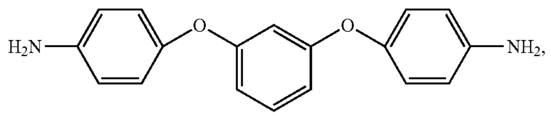
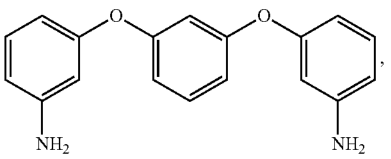
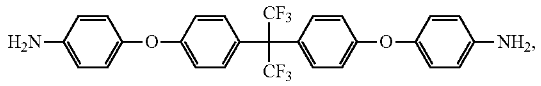

-continued

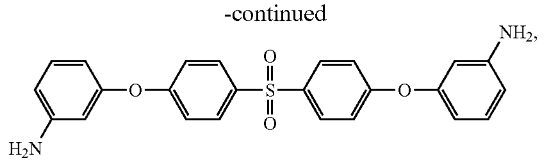

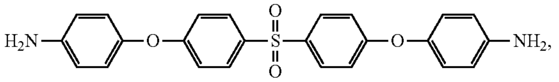

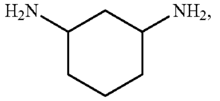

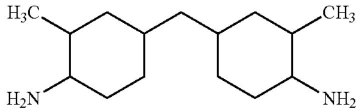

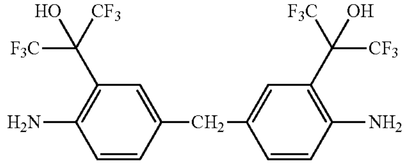

In an embodiment, the diamine may be 2,2'-bis(trifluoromethyl)-4,4'-diaminobiphenyl (TFDB), 2,2-bis(3-amino-4-hydroxyphenyl)hexafluoropropane (APAF), or a combination thereof.

The dianhydride may be tetracarboxylic acid dianhydride, and examples of such a compound may be 3,3',4,4'-biphenyl tetracarboxylic dianhydride (BPDA), bicycle[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), dioxotetrahydrofuran-3-yl)-1,2,3,4-tetrahydronaphthalene-1,2-dicarboxylic anhydride (DTDA), 1,2,4,5-benzene tetracarboxylic acid dianhydride; 1,2,3,4-benzene tetracarboxylic acid dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic acid dianhydride; 1,2,5,6-naphthalene tetracarboxylic acid dianhydride; 1,4,5,8-naphthalene tetracarboxylic acid dianhydride; 2,3,6,7-naphthalene tetracarboxylic acid dianhydride; 2,6-dichloronaphthalene-1,4,5,8-tetracarboxylic acid dianhydride; 2,7-dichloronaphthalene-1,4,5,8-tetracarboxylic acid dianhydride; 2,3,6,7-tetrachloronaphthalene-1,4,5,8-tetracarboxylic acid dianhydride; 3,3',4,4'-biphenyl tetracarboxylic acid dianhydride; 2,2',3,3'-biphenyl tetracarboxylic acid dianhydride; 4,4'-bis(3,4-dicarboxyphenoxy)diphenyl dianhydride; bis(2,3-dicarboxylphenyl) ether dianhydride; 4,4'-bis(2,3-dicarboxyphenoxy) diphenylether dianhydride; 4,4'-bis(3,4-dicarboxyphenoxy) diphenylether dianhydride; bis(3,4-dicarboxylphenyl)sulfide dianhydride; 4,4'-bis(2,3-dicarboxy phenoxy)diphenylsulfide dianhydride; 4,4'-bis(3,4-dicarboxy phenoxy)diphenylsulfide dianhydride; bis(3,4-dicarboxylphenyl)sulfone dianhydride; 4,4'-bis(2,3-dicarboxy phenoxy)diphenylsulfone dianhydride; 4,4'-bis(3,4-dicarboxylphenoxy)diphenylsulfone dianhydride; 3,3',4,4"-benzophenone tetracarboxylic acid dianhydride; 2,2',3,3'-benzophenone tetracarboxylic acid dianhydride; 2,3,3'4'-benzophenone tetracarboxylic acid dianhydride; 4,4'-bis(3,4-dicarboxylphenoxy)benzophenone dianhydride; bis(2,3-dicarboxylphenyl)methane dianhydride; bis(3,4-dicarboxylphenyl) methane dianhydride; 1,1-bis(2,3-dicarboxylphenyl)ethane dianhydride; 1,1-bis(3,4-dicarboxylphenyl)ethane dianhydride; 1,2-bis(3,4-dicarboxylphenyl)ethane dianhydride; 2,2-bis(2,3-dicarboxylphenyl)propane dianhydride; 2,2-bis(3,4-dicarboxylphenyl)propane dianhydride; 2,2-bis[4-(2,3-dicarboxylphenoxy) phenyl]propane dianhydride; 2,2-bis[4-(3,4-dicarboxylphenoxy) phenyl]propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl)phenyl]propane dianhydride; 2,3,4,5-thiophene tetracarboxylic acid dianhydride; 2,3,5,6-pyrazine tetracarboxylic acid dianhydride; 1,8,9,10-phenanthrene tetracarboxylic acid dianhydride; 3,4,9,10-perylene tetracarboxylic acid dianhydride; 2,2-bis(3,4-dicarboxylphenyl) hexafluoropropane dianhydride; 1,3-bis (3,4-dicarboxylphenyl) hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy)phenyl] hexafluoropropane dianhydride; 1,1-bis[4-(3,4-dicarboxylphenoxy)phenyl]-1-phenyl-2,2,2-trifluoroethane dianhydride; and 4,4'-bis[2-(3,4-dicarboxylphenyl)hexafluoroisopropyl]diphenylether dianhydride, and the like. These compounds may be used alone or in combination of two or more thereof, and are not limited to these types. Such dianhydride compounds are commercially available or may be synthesized by known methods.

In an embodiment, the tetracarboxylic acid dianhydride may be 4,4'-oxydiphthalic anhydride (ODPA), 3,3',4,4'-biphenyl tetracarboxylic acid dianhydride (BPDA), 4,4'-(hexafluoroisopropylidene)diphthalic anhydride (6FDA), or a combination thereof.

The organic solvent may include a sulfoxide-based solvent such as dimethylsulfoxide and diethylsulfoxide, a formamide-based solvent such as N,N-dimethyl formamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m-, or p-cresol, xylenol, halogenated phenol, and catechol, hexamethylphosphoramide, γ-butyrolactone, or a mixture thereof. However, this disclosure is not limited to them, and an aromatic hydrocarbon such as xylene and toluene may be used.

Meanwhile, the composition according to an embodiment may further include a solvent, if required. The solvent may be appropriately selected from solvents capable of being used for preparing the polyimide, but is not limited thereto, and may include any solvents as long as uniform dissolving the first polyimide and the second polyimide and easily controlling a concentration of the composition for a coating or the like while not reacting the first polyimide and the second polyimide, or the chromophore functional group bonded with the second polyimide.

Another embodiment provides an electro-optic material including the composition.

As described in above, the composition according to an embodiment may be readily filmed according to the known method in the field pertaining to the arts, for example, a spin coating, a bar coating, and the like, and the electro-optic material film may be easily obtained. As described above, the electro-optic material may have a glass transition temperature of less than or equal to about 300° C., and the glass transition temperature may be readily controlled by adjusting a ratio of mixing the first polyimide and the second polyimide. The prepared electro-optic material may be advantageously applied to production of various electro-optic devices. Examples of the electro-optic device may be an optical waveguide, a phase modulator, a light intensity modulator, a Mach-Zehnder interference system, a beam splitter, a directional coupler, an optical switch, or an X-switch, but are not limited thereto.

Another embodiment provides a method of preparing an electro-optic material including preparing a first polyimide with a weight average molecular weight of greater than or equal to about 100,000 g/mol, preparing a second polyimide having a weight average molecular weight of less than or equal to about 50,000 g/mol and including a structural unit with a chromophore functional group in the side chain, mixing the first polyimide and the second polyimide to provide a mixture, and curing the mixture.

The methods of preparing the first polyimide having a weight average molecular weight of greater than or equal to about 100,000 g/mol, and a second polyimide having a weight average molecular weight of less than or equal to about 50,000 g/mol and including a structural unit with a chromophore functional group in the side chain, mixing the first polyimide and the second polyimide to provide a mixture, and curing the mixture by a coating or other known method to provide an electro-optic material including the cured mixture are described above in detail.

FIG. 1(*a*) refers to a second polyimide having a low molecular weight, for example, a weight average molecular weight of less than or equal to about 50,000 g/mol in which a chromophore functional group (region expressed with circle in drawing) is introduced in the side chain. FIG. 1(*b*) refers to a first polyimide having a high molecular weight, for example, a weight average molecular weight of greater than or equal to about 100,000 g/mol including no chromophore functional group. The mixture of the first polyimide and the second polyimide is represented by FIG. 1(*c*). The mixture represented by FIG. 1(*c*) is coated on a substrate or the like and cured to provide an electro-optic material film as shown in FIG. 1(*d*).

The embodiments are described in more detail through Example and Comparative Examples, but the following Examples and Comparative Examples are for illustrative purposes only and the scope of the present invention is not limited thereto.

EXAMPLES

Synthesis Example 1: Synthesis of Diamine Monomer APAF-DR1 Conjugated with Disperse Red1

A diamine of APAF-DR1 in which a chromophore compound of Disperse red1 (DR1) is conjugated to 2,2-bis(3-amino-4-hydroxyphenyl) hexafluoropropane (APAF) is synthesized according to the following reaction scheme:

Reaction Scheme

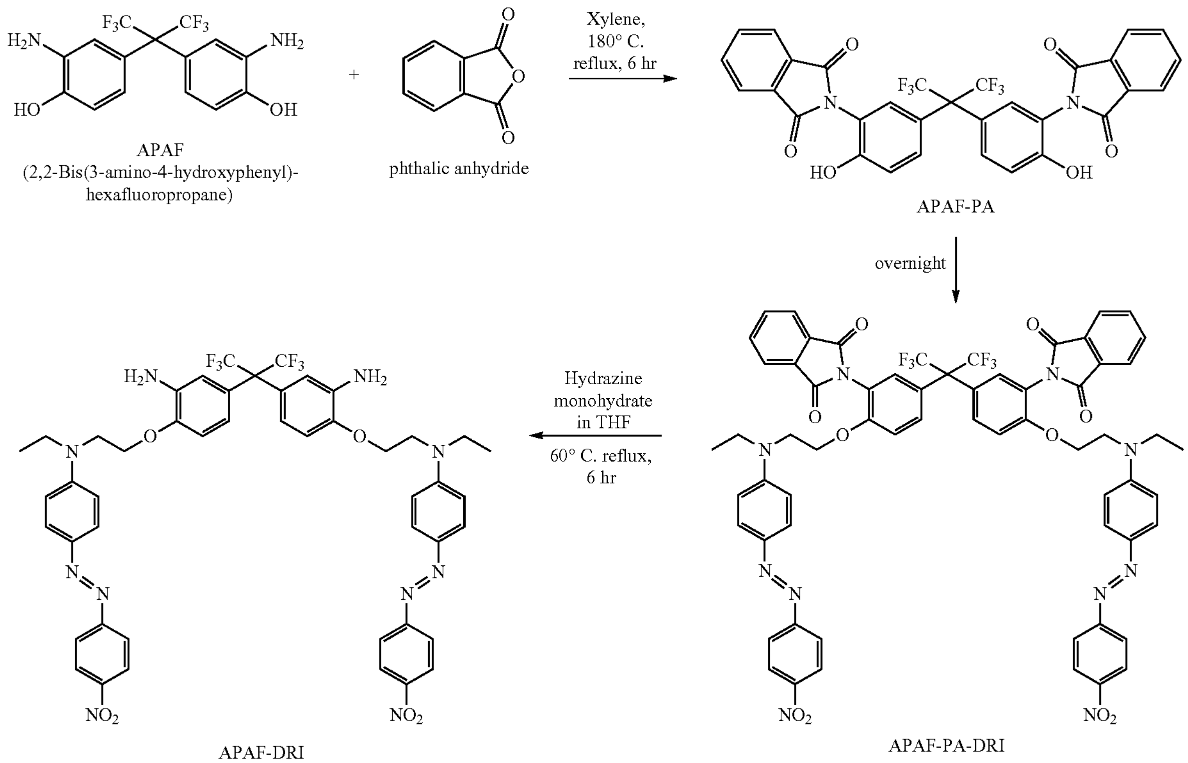

The reaction is described in detail below.

(1) Synthesis of APAF (APAF-PA) Protected with Phthalimide 15 grams (g) of 2,2-bis(3-amino-4-hydroxyphenyl) hexafluoropropane (APAF) and 18.2 g of phthalic anhydride (PA) are added to a 250 milliliter (mL) round-bottomed flask, 50 mL of dimethyl formamide (DMF) is added to the flask, and the resulting mixture is stirred at room temperature with purging nitrogen for 2 hours. Subsequently, 150 mL of xylene is added to the reaction flask, and an azeotropic distillation is performed at 180° C. for 4 hours. The solvent is removed under vacuum at 180° C., and after cooling the reaction solids, is the solids are dissolved in 100 mL of DMF. The DMF solution is added into 200 mL of methanol, and then 700 mL of water is added to provide a precipitate, which is then separated. The obtained precipitate is dried in a vacuum oven at 100° C. to provide a phthalimide-protected APAF (APAF-PA).

(2) Coupling Reaction of Chromophore Compound Disperse Red1 (DR1) (APAF-PA-DR1)

20 g of the obtained APAF-PA and 20.0709 g of the chromophore compound of Disperse red1 are added into a 250 mL round-bottomed flask, and 200 mL of tetrahydrofuran (THF) is added to the flask. 25.1212 g of triphenylphosphine (TPP) is added into the reaction solution and once dissolved, 18.8578 mL of diisopropyl azodicarboxylate (DIAD) is slowly added in a dropwise manner using a syringe, and the reaction mixture is stirred at room temperature overnight (about 12 hours). The reaction solution is moved to a 1 liter (L) beaker, and then 600 mL of methanol is added to the beaker and a precipitate forms, and is then separated. The precipitate is added to 200 mL of trichloromethane ($CHCl_3$) and stirred and dissolved, and the temperature of the solution is increased up to 80° C. Subsequently, 300 mL of methanol is slowly added to the $CHCl_3$ solution and stirred at 80° C. The flask is then stored in a freezer to provide a recrystallized solid that is then separated and dried in a vacuum oven at 80° C. for 24 hours to provide APAF-PA-DR1 in which the chromophore compound of Disperse red1 is coupled to the phthalimide-protected APAF.

(3) Deprotection of Phthalimide 30 g of the synthesized APAF-PA-DR1 is added to a round-bottomed flask, and 100 mL of THF is added to the flask. Subsequently, 150 mL of hydrazine monohydrate is slowly added in a dropwise fashion with a syringe at room temperature, and the reaction mixture is refluxed at 70° C. for 4 hours. The reaction contents are transferred to a separatory funnel and an additional 100 mL of THF is added to the separatory funnel, and the water layer is removed. 300 mL of methanol is slowly added to the organic layer and a precipitate forms. The precipitate is separated and recrystallized with a mixture of trichloromethane/methanol (3/7), and dried in a vacuum oven at 80° C. for 24 hours to provide a chromophore compound DR1-conjugated diamine monomer (APAF-DR1).

Synthesis Example 2: Preparation of Polyimide (ODPA/APAF-DR1) Including Chromophore Functional Group Derived from Disperse Red1 in the Side Chain 1.53 g of 4, 4'-oxydiphthalic anhydride (ODPA) and 4.72 g of APAF-DR1, chromophore DR1-coupled diamine monomer obtained from Synthesis Example 1, are dissolved in 18.75 g of γ-butyrolactone and then polymerized for 48 hours. Subsequently, 0.58 g of pyridine and 1.51 g of acetic anhydride are added thereto and performed with a chemical imidization for 12 hours. The obtained solution is precipitated by 1 L of deionized water and washed by 1 L of ethanol to provide a polyimide (ODPA/APAF-DR1) including a chromophore functional group derived from Disperse red1 in all side chains of the structural unit.

The weight average molecular weight of the obtained polyimide as determined by gel permeation chromatography (GPC), is about 22,452 grams per mole (g/mol), and a polydispersity index (PDI) is 2.0. In addition, the content of diamine (APAF-DR1) including chromophore present in the obtained polyimide (ODPA/APAF-DR1) by $^1$H-NMR analysis, is about 50 weight percent (wt %) based on the total weigh of the polyimide.

Synthesis Example 3: Preparation of Polyimide (ODPA/TFDB) that does not Include Chromophore Functional Group 12.30 g of 4,4'-oxydiphthalic anhydride (ODPA) and 12.70 g of 2,2'-bis(trifluoromethyl)-4,4'-diaminobiphenyl (TFDB) are dissolved in 75 g of dimethyl acetamide (DMAc) and then polymerized for 48 hours. Subsequently, 4.79 g of pyridine and 11.23 g of acetic anhydride are added thereto and performed with a chemical imidization for 12 hours. The obtained solution is precipitated by 4 L of deionized water and washed with 2 liters of ethanol to provide a polyimide (ODPA/TFDB).

The weight average molecular weight of the obtained polyimide as determined by gel permeation chromatography (GPC), is about 114,344 g/mol, and the polydispersity index (PDI) is 2.0.

Synthesis Example 4: Preparation of Polyimide Copolymer (ODPA/APAF-DR1/TFDB=100/50/50) Including Chromophore Functional Group Derived from Disperse Red1 in the Side Chain 2.04 g of 4, 4'-oxydiphthalic anhydride (ODPA) and 3.16 g of APAF-DR1, chromophore DR1-coupled diamine monomer obtained from Synthesis Example 1, and 1.05 g of 2,2'-bis(trifluoromethyl)-4,4'-diaminobiphenyl (TFDB) are dissolved in 18.75 g of γ-butyrolactone and then polymerized for 48 hours. Subsequently, 0.80 g of pyridine and 1.86 g of acetic anhydride are added to the reaction mixture, followed by chemical imidization for 12 hours. The obtained solution is precipitated with 4 L of deionized water, and washed with 1 L of ethanol to provide a polyimide copolymer including AFAF-DR1 and TFDB as a diamine component at a mole ratio of 50:50.

The weight average molecular weight of the polyimide copolymer as determined by gel permeation chromatography (GPC) is about 27,081 g/mol, and the polydispersity index (PDI) is 2.3. In addition, the content of diamine (APAF-DR1) including chromophore introduced in the obtained polyimide (ODPA/APAF-DR1) as determined by $^1$H-NMR analysis is about 22 weight percent.

Synthesis Example 5: Preparation of Polyimide Copolymer (ODPA/APAF-DR1/TFDB=100/25/75) Including Chromophore Functional Group Derived from Disperse Red1 in the Side Chain 2.45 g of 4, 4'-oxydiphthalic anhydride (ODPA), 1.90 g of APAF-DR1, chromophore DR1-coupled diamine monomer obtained from Synthesis Example 1, and 1.90 g of 2,2'-bis (trifluoromethyl)-4,4'-diaminobiphenyl (TFDB) are dissolved in 18.75 g of γ-butyrolactone and then polymerized for 48 hours. Subsequently, 0.80 g of pyridine and 1.86 g of acetic anhydride are added to the polymer mixture, and a chemical imidization is performed for 12 hours. The obtained solution is precipitated by 1 L of deionized water and washed with 1 L of ethanol to provide a polyimide copolymer (ODPA/AFAF-DR1/TFDB=100/25/75) including AFAF-DR1 and TFDB as a diamine component in a mole ratio of 25:75.

The weight average molecular weight of the obtained polyimide copolymer as determined by gel permeation chromatography (GPC) is about 122,822 g/mol, and the polydispersity index (PDI) is 2.3. In addition, a content of diamine (APAF-DR1) with the chromophore in the obtained polyimide (ODPA/APAF-DR1) is determined by $^1$H-NMR analysis to be about 9 wt %.

Preparation Example 1: Confirmation of Film Formation and Characteristics

The polyimide (ODPA/APAF-DR1) of Synthesis Example 2, the polyimide (ODPA/TFDB) of Synthesis Example 3), and the polyimide copolymer (ODPA/APAF-DR1/TFDB=100:50:50) of Synthesis Example 4, in which the chromophore functional group is included at only 50 mol % of diamine (i.e., lower content than in Synthesis Example 2), and the polyimide copolymer (ODPA/APAF-DR1/TFDB=100:25:75) Synthesis Example 5 including the chromophore functional group at only 25 mol % of diamine (lower content than in Synthesis Example 4), which are obtained from Synthesis Examples 2 to 5, is dissolved in N-2-methylpyrrolidone to 15 wt %, and then spin-coated on a 5 cm×5 cm (length×width) glass substrate at a speed of 1,200 revolutions per minute (rpm) to confirm whether it is coated or not.

Figure 2:
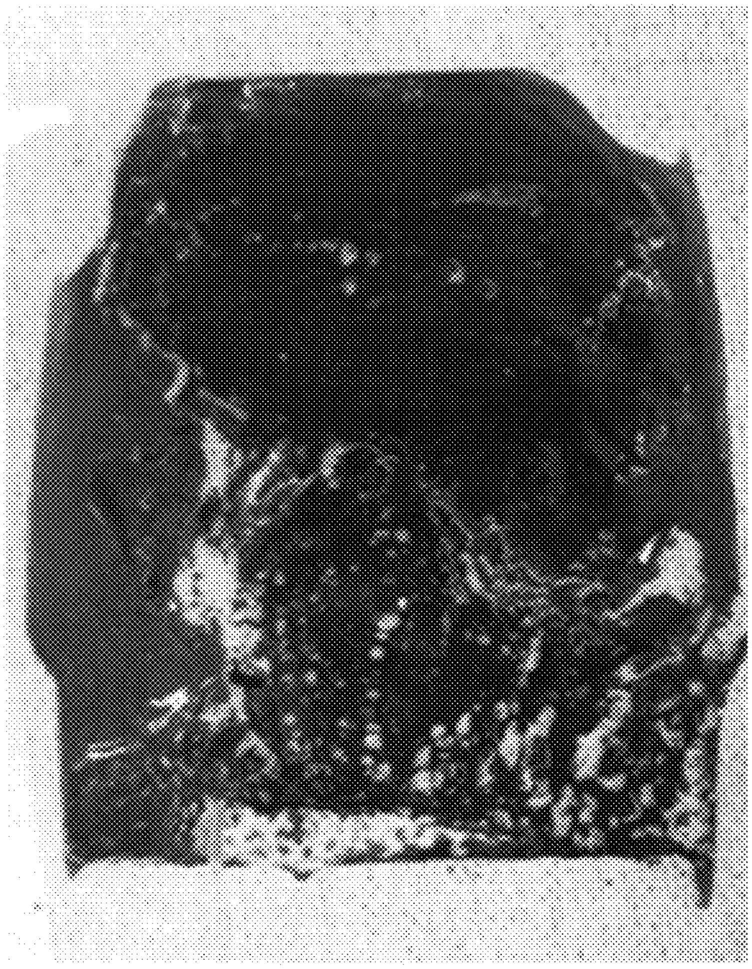
FIG. 2 is a photograph of a film prepared from the polyimide prepared in Synthesis Example 4.

From the results, it is confirmed that both of the polyimide (ODPA/APAF-DR1) according to Synthesis Example 2 having a weight average molecular weight of 22,452 g/mol, and the polyimide copolymer (ODPA/APAF-DR1/TFDB=100:50:50) according to Synthesis Example 4 having a weight average molecular weight of 27,081 g/mol, are brittle and could not be formed into a film. FIG. 2 is an image of a film obtained from Synthesis Example 4, which appears to have some film shape thought the film is overall hazy and brittle.

Figure 3:
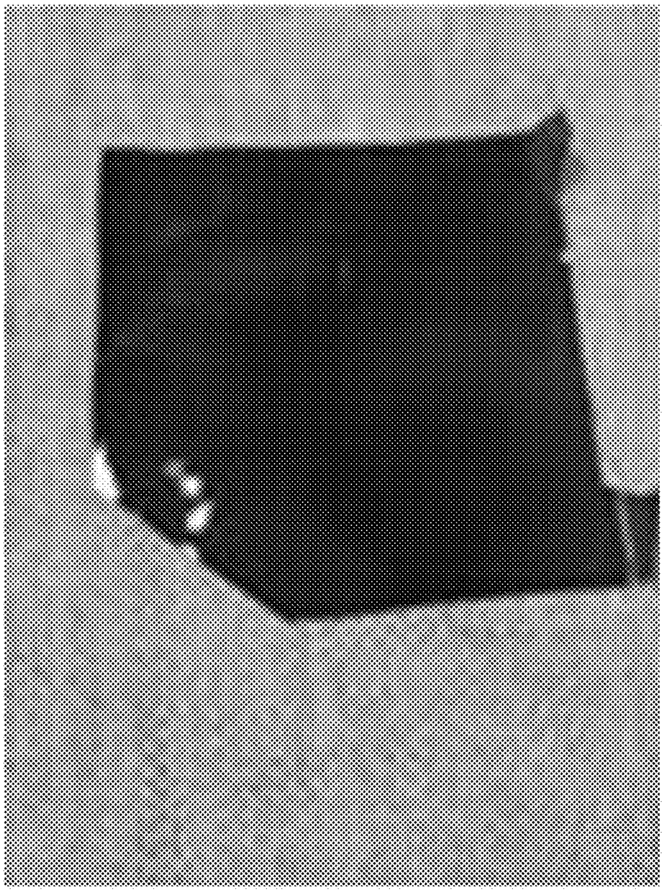
FIG. 3 is a photograph of the film prepared in Synthesis Example 5.

On the other hand, the polyimide copolymer (ODPA/APAF-DR1/TFDB=100:25:75) according to Synthesis Example 5 having a weight average molecular weight of 122,822 g/mol, and the polyimide (ODPA/TFDB) according to Synthesis Example 3 having a weight average molecular weight of 114,344 g/mol including no chromophore functional group are not brittle and can readily be processed into a film. FIG. 3 is a photograph of the film obtained from Synthesis Example 5. The corresponding film maintains a transparent and smooth film shape.

Resultantly, when the polyimide is polymerized by including the chromophore functional group in greater than or equal to 50 mol % based on a total amount of diamine, the weight average molecular weight of the obtained polyimide is considerably less than 50,000 g/mol, and a film could not be formed.

On the other hand, when the polymerization is performed by including the chromophore functional group in 25 mol % based on the content of diamine, the weight average molecular weight of the obtained polyimide is greater than about 100,000 g/mol, which is equivalent to the weight average molecular weight of the polyimide obtained from Synthesis Example 3 polymerized by including no chromophore functional group. But in this instance, as in Synthesis Example 5, the content of the diamine including a chromophore functional group which is substantially introduced into polyimide is only 9 wt %—a relatively small amount. That is, when the chromophore-containing diamine is polymerized with dianhydride according to the general polyimide polymerization, the content of diamine including chromophore functional group capable of synthesizing a polyimide having a high molecular weight of a weight average molecular weight of greater than or equal to about 100,000 g/mol is less than 10 wt % based on the total weight of monomers for the polyimide, which is a very small amount. In other words, a content of the chromophore functional group capable of being included in the polyimide having a high molecular weight polymerized by the general polymerization method is very small.

Examples 1 to 6: Film Formation and Characteristics Confirmation by Mixing Polyimide of High Molecular Weight and Polyimide of Low Molecular Weight and Including Chromophore Functional Group The polyimide (ODPA/APAF-DR1) obtained by Synthesis Example 2 having a weight average molecular weight of less than or equal to 50,000 g/mol and including chromophore functional groups in every imide structural unit, and the polyimide (ODPA/TFDB) according to Synthesis Example 3 having a weight average molecular weight of greater than or equal to 100,000 g/mol including no chromophore functional group are mixed at a ratio shown in Table 1, and the mixtures are each coated on a substrate as in Preparation Example 1 to provide films according to Examples 1 to 6. In addition, the film obtained from the polyimide (ODPA/TFDB) according to Synthesis Example 3 having a weight average molecular weight of greater than or equal to 100,000 g/mol and including no chromophore functional group is listed as Control in Table 1.

The amount (wt %) of the structural unit derived from the diamine including a chromophore functional group in each film is also shown in Table 1, and the glass transition temperature of each obtained film is measured and listed in Table 1. The glass transition temperature of the film is measured by heating from 50° C. to 350° C. at a heating rate of 5° C./minute using a thermal mechanical analyzer ((TMA: Q400, TA Instruments) at a tensile strength of 0.05 N.

Figure 4:
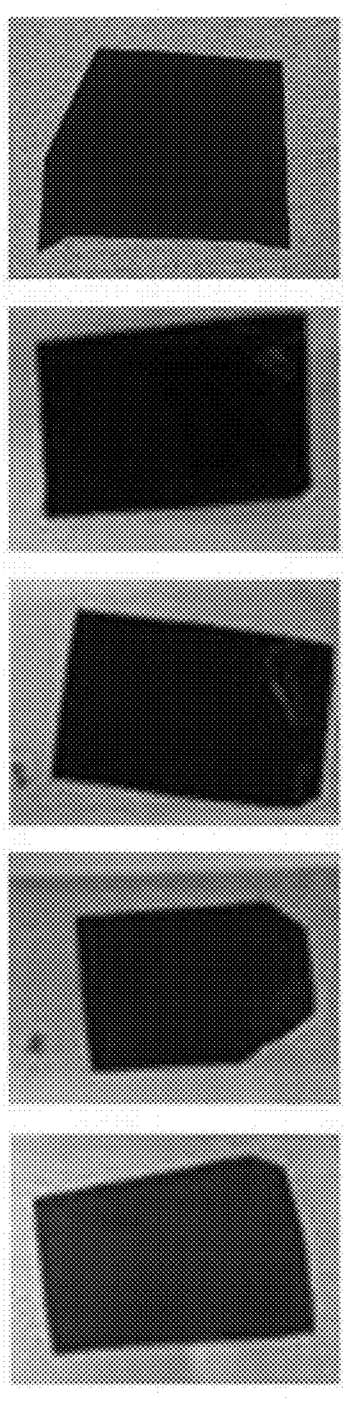
FIG. 4 is a photograph of a film according to Examples 1, 2, 3, 5, and 6.

In addition, FIG. 4 is photographs showing the films obtained by mixing the polyimide according to Synthesis Examples 2 and 3 at a ratio of Examples 1, 2, 3, 5, and 6 of Table 1, sequentially from left. As shown in FIG. 4, the films according to the Examples prepared by including the chromophore-containing diamine in less than or equal to 25 weight % based on the total weight of the film are all transparent and not brittle, and maintain smooth shapes.

TABLE 1

| | Mixing ratio (weight %) of polyimide (Synthesis Ex. 2: Synthesis Ex. 3) | | Amount of structural unit derived from diamine including a chromophore functional | Glass transition |
|---|---|---|---|---|
| | Syn. Ex. 2 (ODPA/APAF-DR1) | Syn. Ex. 3 (ODPA/TFDB) | group in film (weight %) | temperature (Tg) (° C.) |
| Control | 0 | 100 | 0 | 324 |
| Example 1 | 5 | 95 | 2.5 | 308 |
| Example 2 | 10 | 90 | 5 | 293 |

TABLE 1-continued

| | Mixing ratio (weight %) of polyimide (Synthesis Ex. 2: Synthesis Ex. 3) | | Amount of structural unit derived from diamine including a chromophore functional | Glass transition |
|---|---|---|---|---|
| | Syn. Ex. 2 (ODPA/APAF-DR1) | Syn. Ex. 3 (ODPA/TFDB) | group in film (weight %) | temperature (Tg) (° C.) |
| Example 3 | 20 | 80 | 10 | 270 |
| Example 4 | 25 | 75 | 12.5 | 264 |
| Example 5 | 40 | 60 | 20 | 258 |
| Example 6 | 50 | 50 | 25 | 250 |

As understood from Table 1, the film obtained by mixing the low molecular weight polyimide including a chromophore functional group in the side chain (polyimide according to Synthesis Example 2) and the high molecular weight polyimide having no chromophore functional group (polyimide according to Synthesis Example 3) provides a change in the glass transition temperature depending upon the mixing ratio of the two different polyimides. In other words, as the relative amount of the low molecular weight polyimide including the chromophore functional group is increases, the glass transition temperature of the mixed polyimide decreases, and as the relative amount of the high molecular weight polyimide including no chromophore functional group increases, the glass transition temperature increases.

Accordingly, by mixing the low molecular weight polyimide including the chromophore functional group in the side chain and the high molecular weight polyimide having no chromophore functional group according to an embodiment, it is possible to form a polyimide film while increasing the content of the chromophore functional group. Accordingly, an electro-optic material may easily be prepared with control of the glass transition temperature of the material by changing the mixing ratio of the different polyimides.

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A composition for preparing an electro-optic material, the composition comprising a first polyimide having a high molecular weight, and a second polyimide having a lower molecular weight that includes a structural unit comprising a chromophore functional group in the side chain.

2. The composition of claim 1, wherein the first polyimide has a weight average molecular weight of greater than or equal to about 100,000 grams per mole, and the second polyimide has a weight average molecular weight of less than or equal to about 50,000 grams per mole.

3. The composition of claim 1, wherein a content of the structural unit comprising the chromophore functional group in the side chain is less than about 50 weight percent based on a total weight of the first polyimide and the second polyimide.

4. The composition of claim 1, wherein a content of the structural unit comprising the chromophore functional group in the side chain is about 1 weight percent to about 30 weight percent based on a total weight of the first polyimide and the second polyimide.

5. The composition of claim 1, wherein the first polyimide and the second polyimide are included in a weight ratio of about 99:1 to about 50:50.

6. The composition of claim 1, wherein the first polyimide comprises a structural unit represented by Chemical Formula 1, and the second polyimide comprises a structural unit represented by Chemical Formula 2:

Chemical Formula 1

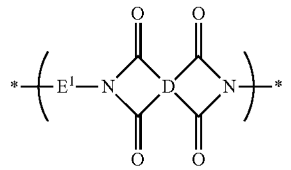

Chemical Formula 2

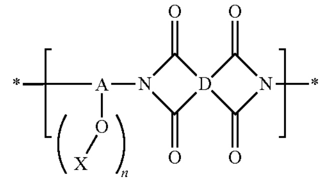

wherein, in Chemical Formula 1 and Chemical Formula 2,

D is independently a substituted or unsubstituted quadrivalent C4 to C30 alicyclic organic group, a substituted or unsubstituted quadrivalent C6 to C30 aromatic organic group, or a substituted or unsubstituted quadrivalent C4 to C30 heteroaromatic organic group, or a combination thereof, $E^1$ is a substituted or unsubstituted divalent C1 to C30 aliphatic organic group, a substituted or unsubstituted divalent C4 to C30 alicyclic organic group, a substituted or unsubstituted divalent C6 to C30 aromatic organic group, a substituted or unsubstituted divalent C4 to C30 heteroaromatic organic group, or a combination thereof, A is a substituted or unsubstituted C4 to C30 alicyclic organic group, a substituted or unsubstituted C6 to C30 aromatic organic group, or a substituted or unsubstituted C4 to C30 heteroaromatic organic group, or a combination thereof, in D, $E^1$, and A, the alicyclic organic group, the aromatic organic group, the heteroaromatic organic group, or the combination thereof is a single ring, a condensed ring in which at least two rings are fused, or at least two rings of the single ring or the condensed ring, each of which is linked to the other by a single bond, a fluorenylene group, $—O—$, $—S—$, $—C({=}O)—$, $—CH(OH)—$, $—S({=}O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein $1 \leq n \leq 10$, $1 \leq p \leq 10$, and $1 \leq q \leq 10$), $—C(CF_3)(C_6H_5)—$, —C(=O)NH—, or a combination thereof, X is a chromophore functional group, and n of Chemical Formula 2 is one of integers of 1 to 4.

7. The composition of claim 6, wherein D of Chemical Formula 1 and Chemical Formula 2 is independently selected from chemical formulae of Group 1:

Group 1

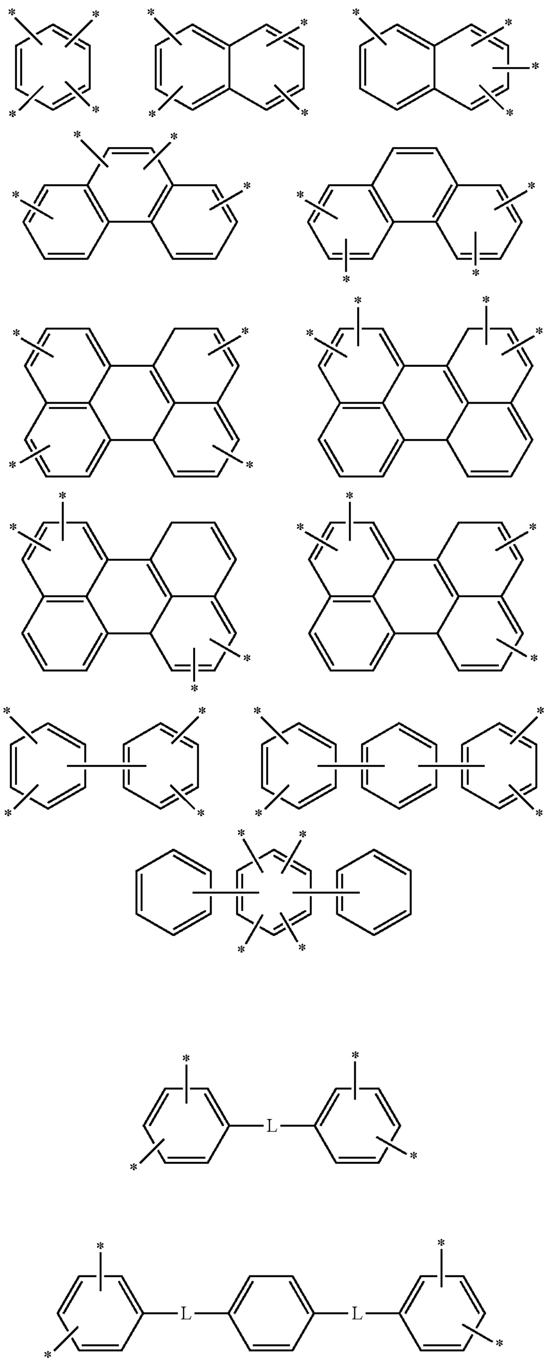

-continued

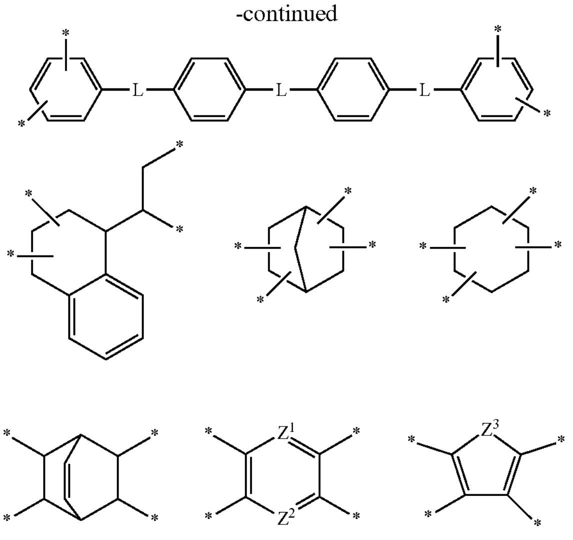

wherein, in the above chemical formulae, each moiety is substituted or unsubstituted, and each L is the same or different and is independently a single bond, fluorenylene group, —O—, —S—, —C(=O)—, —CH(OH)—, $—S(=O)_2—$, $—Si(CH_3)_2—$, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein $1 \leq n \leq 10$, $1 \leq p \leq 10$, and $1 \leq q \leq 10$), $—C(CF_3)(C_6H_5)—$, or —C(=O)NH—,

* is a linking portion with an adjacent atom, $Z^1$ and $Z^2$ are each the same or different and are independently —N= or $—C(R^{100})=$, wherein $R^{100}$ is hydrogen or a C1 to C5 alkyl group, provided that $Z^1$ and $Z^2$ are not simultaneously $—C(R^{100})=$, and $Z^3$ is —O—, —S—, or $—NR^{101}—$, wherein $R^{101}$ is hydrogen or a C1 to C5 alkyl group.

8. The composition of claim 6, wherein $E^1$ of Chemical Formula 1 and A of Chemical Formula 2 are independently a substituted or unsubstituted C6 to C30 aromatic single ring, a C10 to C30 condensed ring in which at least two substituted or unsubstituted aromatic rings are fused, or at least two aromatic rings of the single ring or the condensed ring, each of which is linked to the other by a single bond, or —O—, —S—, $—(CH_2)_p—$, $—(CF_2)_q—$, $—C(C_nH_{2n+1})_2—$, $—C(C_nF_{2n+1})_2—$, $—(CH_2)_p—C(C_nH_{2n+1})_2—(CH_2)_q—$, $—(CH_2)_p—C(C_nF_{2n+1})_2—(CH_2)_q—$ (wherein, $1 \leq n \leq 10$, $1 \leq p \leq 10$, and $1 \leq q \leq 10$), $C(CF_3)(C_6H_5)—$, —C(=O)NH—, or a combination thereof.

9. The composition of claim 6, wherein $E^1$ of Chemical Formula 1 and A of Chemical Formula 2 are independently a group in which substituted or unsubstituted two phenylene groups are linked by a single bond, or —O—, —S—, $—(CH_2)_p—$, $—(CF_2)_q—$, $—C(C_nH_{2n+1})_2—$, $—C(C_nF_{2n+1})_2—$, (wherein $1 \leq n \leq 10$, $1 \leq p \leq 10$, and $1 \leq q \leq 10$), or a combination thereof and —(O—X)n linked with A of Chemical Formula 2 may include the two phenylene groups with which each —O—X is linked.

10. The composition of claim 1, wherein the chromophore functional group is one or more of those represented by Chemical Formulae 3-1 to 3-8:

-continued
(3-1)
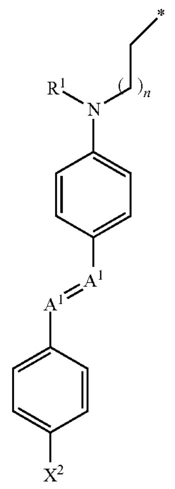
(3-2)
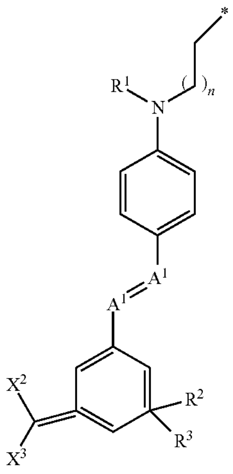
(3-3)
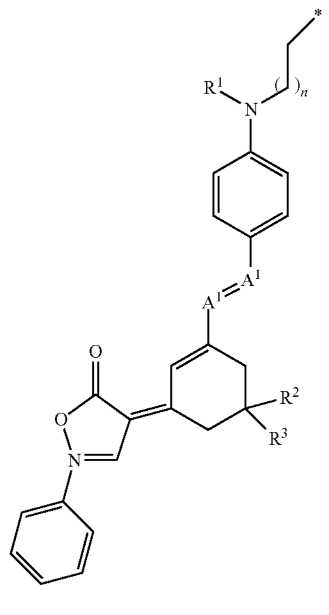
(3-4)
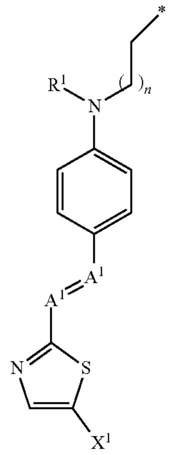
(3-5)
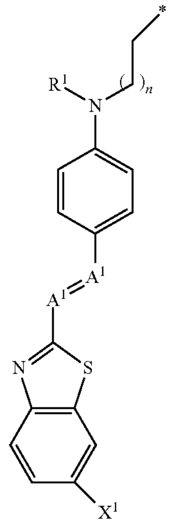
(3-6)
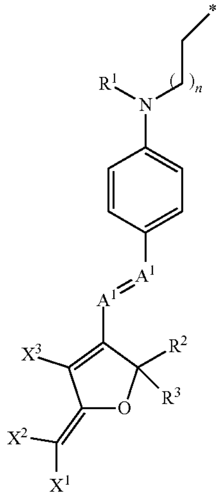

-continued (3-7)

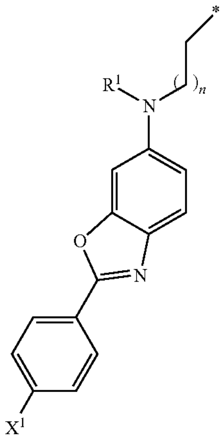

(3-8)

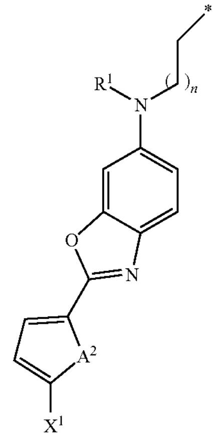

wherein, in Chemical Formulae 3-1 to 3-8, $R^1$ to $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$ to $X^3$ are independently a C1 to C10 alkyl group that is substituted or unsubstituted with $-NO_2$, —CN, or a sulfone group ($-SO_2$), —C(CN)=C(CN$_2$), R—(C=O)O— (wherein R is a substituted or unsubstituted C1 to C10 alkyl group, or a substituted or unsubstituted C6 to C30 aryl group), a halogen element, or a haloalkyl group, n is one of integers of 1 to 11, and

* is a linking portion with the side chain of the second polyimide.

11. The composition of claim 1, wherein the chromophore functional group is at least one of the following chemical formulae:

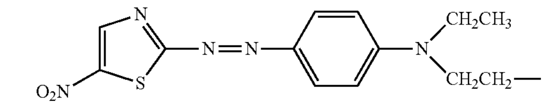

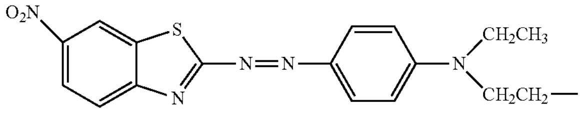

-continued

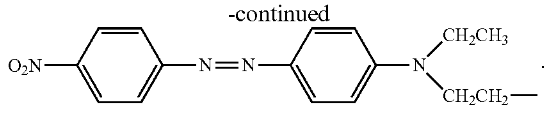

12. The composition of claim 1, wherein the first polyimide comprises a structural unit represented by Chemical Formula 5, and the second polyimide comprises a structural unit represented by Chemical Formula 6:

Chemical Formula 5

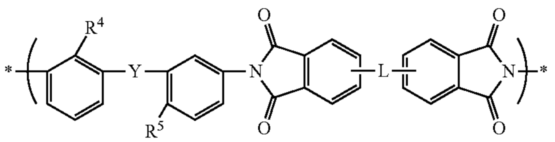

Chemical Formula 6

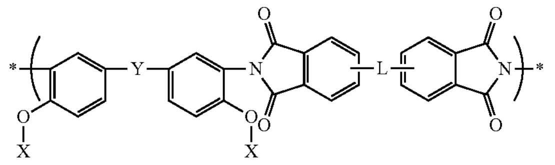

wherein, in Chemical Formula 5 and Chemical Formula 6,

Y and L are independently, a single bond, —O—, —S—, $-(CH_2)_p-$, $-(CF_2)_q-$, $-C(C_nH_{2n+1})_2-$, $-C(C_nF_{2n+1})_2-$, $-(CH_2)_p-C(C_nH_{2n+1})_2-(CH_2)_q-$, $-(CH_2)_p-C(C_nF_{2n+1})_2-(CH_2)_q-$ (wherein $1 \leq n \leq 10$, $1 \leq p \leq 10$, and $1 \leq q \leq 10$), $-C(CF_3)(C_6H_5)-$, —C(=O)NH—, or a combination thereof, wherein, in Chemical Formula 5, $R^4$ and $R^5$ are independently a unsubstituted C1 to C4 alkyl group, a halogen, —CN, $-NO_2$, or a C1 to C4 alkyl group substituted with at least one halogen element, wherein, in Chemical Formula 6, each X is represented by one of Chemical Formulae 3-1 to 3-8:

(3-1)

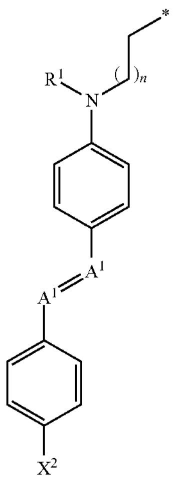

-continued
(3-2)
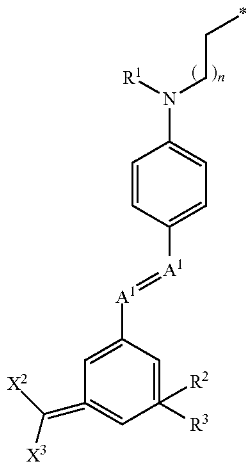
(3-3)
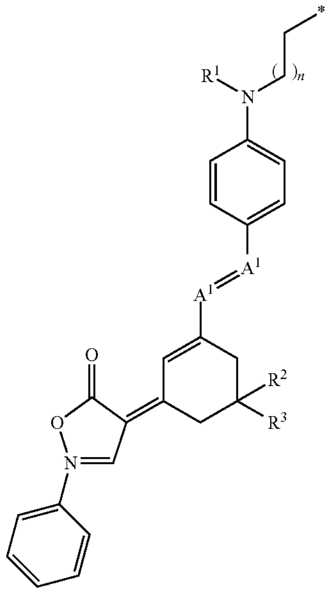
(3-4)
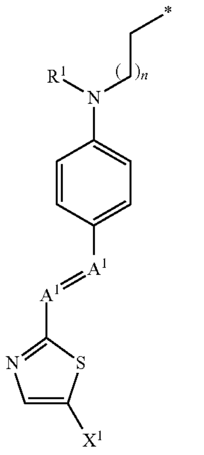
-continued
(3-5)
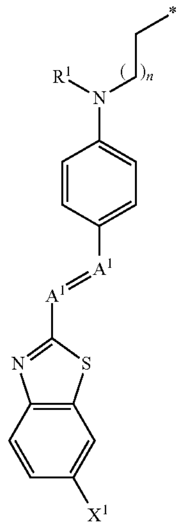
(3-6)
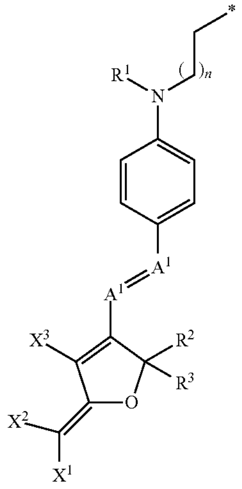
(3-7)
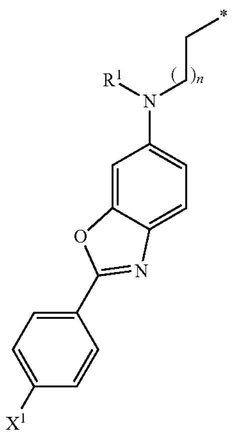

-continued (3-8)

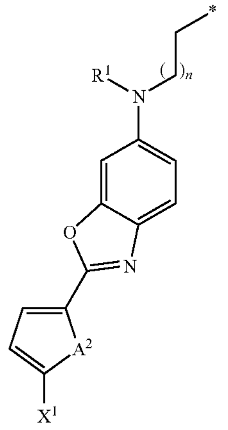

wherein, in Chemical Formulae 3-1 to 3-8, $R^1$ to $R^3$ are independently hydrogen, a substituted or unsubstituted C1 to C10 alkyl group, a substituted or unsubstituted C3 to C10 cycloalkyl group, a substituted or unsubstituted C6 to C30 aryl group, or a combination thereof, $A^1$ is independently CH or N, $X^1$ to $X^3$ are independently a C1 to C10 alkyl group that is substituted or unsubstituted with —$NO_2$, —CN, or a sulfone group (—$SO_2$), —C(CN)=C($CN_2$), R—(C=O)O— (wherein R is a substituted or unsubstituted C1 to C10 alkyl group, or a substituted or unsubstituted C6 to C30 aryl group), a halogen element, or a haloalkyl group, and n is one of integers of 1 to 11.

13. The composition of claim 12, wherein in Chemical Formula 5 and Chemical Formula 6, L is a single bond, —O—, or —C($CF_3$)$_2$, Y of Chemical Formula 5 is a single bond, Y of Chemical Formula 6 is —C($CF_3$)$_2$, X of Chemical Formula 6 is represented by Chemical Formula 3-1, $A^1$ of Chemical Formula 3-1 is a nitrogen atom, $R^1$ is a C1 to C4 alkyl group, and $X^1$ is a $NO_2$ group.

14. An electro-optic material comprising the composition of claim 1.

15. The electro-optic material of claim 14, wherein a glass transition temperature (Tg) of the electro-optic material is less than or equal to about 300° C.

16. The electro-optic material of claim 14, wherein a content of the chromophore functional group in the electro-optic material is less than or equal to about 30 weight percent based on a total weight of the electro-optic material.

17. The electro-optic material of claim 14, wherein the electro-optic material is in a shape of a film.

18. An electro-optic device comprising the electro-optic material of claim 14.

19. The electro-optic device of claim 18, wherein the electro-optic device is an optical waveguide, a phase modulator, a light intensity modulator, a Mach-Zehnder interference system, a beam splitter, a directional coupler, an optical switch, or an X-switch.

20. A method of preparing an electro-optic material comprising preparing a first polyimide with a weight average molecular weight of greater than or equal to about 100,000 g/mol, preparing a second polyimide having a weight average molecular weight of less than or equal to about 50,000 g/mol and including a structural unit including a chromophore functional group in the side chain, preparing a mixture by mixing the first polyimide and the second polyimide, and curing the mixture.

* * * * *